US012072649B2

(12) United States Patent
Ikeno

(10) Patent No.: US 12,072,649 B2
(45) Date of Patent: Aug. 27, 2024

(54) FIXING DEVICE AND IMAGE FORMING APPARATUS

(71) Applicant: BROTHER KOGYO KABUSHIKI KAISHA, Nagoya (JP)

(72) Inventor: Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/186,356

(22) Filed: Mar. 20, 2023

(65) Prior Publication Data

US 2023/0314985 A1 Oct. 5, 2023

(30) Foreign Application Priority Data

Mar. 30, 2022 (JP) ................................ 2022-055301

(51) Int. Cl.

| | |
|---|---|
| ***G03G 15/20*** | (2006.01) |
| ***G03G 15/00*** | (2006.01) |
| ***G03G 15/16*** | (2006.01) |
| ***G03G 21/18*** | (2006.01) |

(52) U.S. Cl.

CPC ....... *G03G 15/167* (2013.01); *G03G 15/2053* (2013.01); *G03G 15/206* (2013.01); *G03G 15/751* (2013.01); *G03G 21/1832* (2013.01); *G03G 2221/1654* (2013.01)

(58) Field of Classification Search

CPC ............. G03G 15/167; G03G 15/2017; G03G 15/2032; G03G 15/2053; G03G 15/206; G03G 15/2064; G03G 15/751; G03G 21/1832; G03G 2221/1654

See application file for complete search history.

(56) References Cited

U.S. PATENT DOCUMENTS

| | | | | |
|---|---|---|---|---|
| 5,926,680 | A * | 7/1999 | Yamamoto ......... | G03G 15/2053 399/328 |
| 9,405,244 | B1 * | 8/2016 | Kitagawa ........... | G03G 15/2053 |
| 2011/0206424 | A1 * | 8/2011 | Tagami .............. | G03G 15/2003 399/322 |
| 2019/0107806 | A1 * | 4/2019 | Johnson, Jr. ....... | G03G 21/1842 |
| 2019/0163121 | A1 * | 5/2019 | Wada ................. | G03G 15/2017 |
| 2022/0187747 | A1 * | 6/2022 | Otaka ................ | G03G 15/2017 |
| 2022/0382192 | A1 * | 12/2022 | Inoue ................. | G03G 15/2053 |
| 2023/0082752 | A1 * | 3/2023 | Toyota ............... | G03G 15/2017 399/328 |

FOREIGN PATENT DOCUMENTS

| | | | |
|---|---|---|---|
| JP | 2002-72750 | A | 3/2002 |
| JP | 2006-47593 | A | 2/2006 |
| JP | 2015-191115 | A | 11/2015 |

* cited by examiner

*Primary Examiner* — Sophia S Chen
(74) *Attorney, Agent, or Firm* — Merchant & Gould P.C.

(57) ABSTRACT

A fixing device includes a first rotating body, a second rotating body, a frame, a shutter, a pressure arm, a cam, a shutter arm, and an arm cam. The shutter is rotatable about a first axis between a closed position and an open position. The pressure arm presses the first rotating body against the second rotating body. The cam is rotatable about a second axis and pushes the pressure arm. The shutter arm is connected to the shutter and rotates about the second axis independent of the cam, to cause the shutter to rotate between the closed position and the open position. The arm cam rotates about the second axis to push the shutter arm at a position offset from the second axis and cause the shutter arm to rotate about the second axis.

17 Claims, 19 Drawing Sheets

FIXING DEVICE AND IMAGE FORMING APPARATUS

REFERENCE TO RELATED APPLICATIONS

This application claims priority from Japanese Patent Application No. 2022-055301 filed on Mar. 30, 2022. The entire content of the priority application is incorporated herein by reference.

BACKGROUND ART

An image forming apparatus known in the art comprises a first housing, a second housing, a fixing device, a shutter, and a shutter arm. The second housing slides relative to the first housing in which the fixing device is located. The shutter covers/uncovers an opening of the fixing device through which a sheet passes. The shutter arm opens/closes the shutter in conjunction with the movement of the second housing. The shutter arm extends in the up-down direction in a position between the fixing device and a process cartridge.

The shutter arm comprises a roller on an upper end thereof. The second housing includes a guide rail on which the roller is located. The guide rail has an inclined portion for moving the roller upward or downward. When the second housing is slid, the shutter arm is guided by the guide rail and moves upward or downward to close or to open the shutter.

DESCRIPTION

In such an image forming apparatus with the shutter arm located between the fixing device and the process cartridge, the image forming apparatus may undesirably increase in size.

It would be desirable to restrain an image forming apparatus with a shutter arm for opening/closing a shutter of a fixing device from increasing in size.

Thus, in one aspect, a fixing device disclosed herein comprises a first rotating body, a second rotating body, a frame, a shutter, a pressure arm, a cam, a shutter arm, and an arm cam. The second rotating body forms a nip in combination with the first rotating body. The frame is configured to support the first rotating body and the second rotating body. The frame has an opening through which a sheet conveyed toward the nip passes. The shutter is rotatable about a first axis between a closed position in which the shutter covers the opening and an open position in which the shutter uncovers the opening. The pressure arm presses the first rotating body against the second rotating body. The cam is rotatable about a second axis and pushes the pressure arm. The shutter arm is connected to the shutter and rotates about the second axis independent of the cam, to cause the shutter to rotate between the closed position and the open position. The arm cam rotates about the second axis to push the shutter arm at a position offset from the second axis and cause the shutter arm to rotate about the second axis.

According to this configuration, since the rotation axis of the shutter arm coincides with the rotation axis of the cam, a length of the shutter arm protruding outward from the frame of the fixing device can be reduced; thus, the image forming apparatus can be restrained from increasing in size.

The fixing device may be configured to further comprise a shaft that supports the cam and is rotatable about the second axis, wherein the arm cam includes a hollow cylindrical portion in which the shaft is received, and wherein the shutter arm has a hole in which the hollow cylindrical portion is received.

The shutter may include a protrusion, and the shutter arm may have an elongated hole in which the protrusion is received.

When the shutter is in the closed position, the protrusion of the shutter may be located on a side of a plane containing the first axis and the second axis, on which the nip is located, and when the shutter is in the open position, the protrusion of the shutter may be located on another side of the plane, opposite to the side on which the nip is located.

According to this configuration, since the open/close operation of the shutter can be performed even if a length of the elongated hole of the shutter arm is reduced, the upsizing of the shutter arm can be restrained.

The fixing device may be configured to further comprise a shaft that supports the cam and is rotatable about the second axis, wherein the frame comprises a first frame configured to support the first rotating body and the second rotating body, and a second frame attached to the first frame and configured to hold the shaft in combination with the first frame, and wherein the shutter is supported by the second frame via a boss.

The boss may be located on an upstream side of the nip in a direction of conveyance of the sheet.

The second axis may be located on a downstream side of the nip in the direction of conveyance of the sheet.

The pressure arm may comprise a first pressure arm and a second pressure arm located at opposite ends of the frame apart from each other in a longitudinal direction, and the first pressure arm may be located between the shutter arm and the second pressure arm in the longitudinal direction.

The fixing device may be configured to comprise a heater comprising a substrate and a resistance heating element disposed on the substrate, wherein the first rotating body is an endless belt heated by the heater and that rotates around the heater.

The fixing device may be configured to further comprise a connector that provides electricity to the heater, wherein the heater comprises a power-supply terminal on at least one of two opposite ends of the substrate located apart from each other in the longitudinal direction, the power-supply terminal being supplied with electricity from the connector, wherein the second rotating body is a pressure roller rotatable about a third axis, and wherein the shutter arm is located on a side of the connector opposite to another side of the connector on which the third axis is located.

The fixing device may be configured to further comprise a spring contactable with the shutter arm, wherein the arm cam presses the shutter arm via the spring to locate the shutter in the closed position.

The arm cam may contact the shutter arm to locate the shutter in the open position.

In another aspect, an image forming apparatus disclosed herein comprises a main housing, a unit installable into and removable from the main housing, and a fixing device.

The arm cam rotates about the second axis when the unit is installed into or removed from the main housing. The shutter arm causes the shutter to rotate from the closed position to the open position when the unit is installed into the main housing, and causes the shutter to rotate from the open position to the closed position when the unit is removed from the main housing.

The image forming apparatus may further comprise a connection link connected to the arm cam. The connection link may be movable relative to the main housing and configured move when the unit being installed into the main housing contacts the connection link.

The image forming apparatus may be configured to further comprise a lock that keeps the shutter in the open position or in the closed position and comprises a lock arm configured to contact the connection link, and a lock spring that biases the lock arm toward the connection link, wherein the connection link includes a link protrusion. The link protrusion is provided on a side of the connection link facing the lock.

The unit may comprise a unit shaft that contacts the connection link when the unit is being installed into the main housing. The main housing may include a guide rail that guides the unit shaft.

The unit may comprise a photosensitive drum.

The above and other aspects, their advantages and further features will become more apparent by describing in detail illustrative, non-limiting embodiments thereof with reference to the accompanying drawings briefly described below:

Figure 1A:
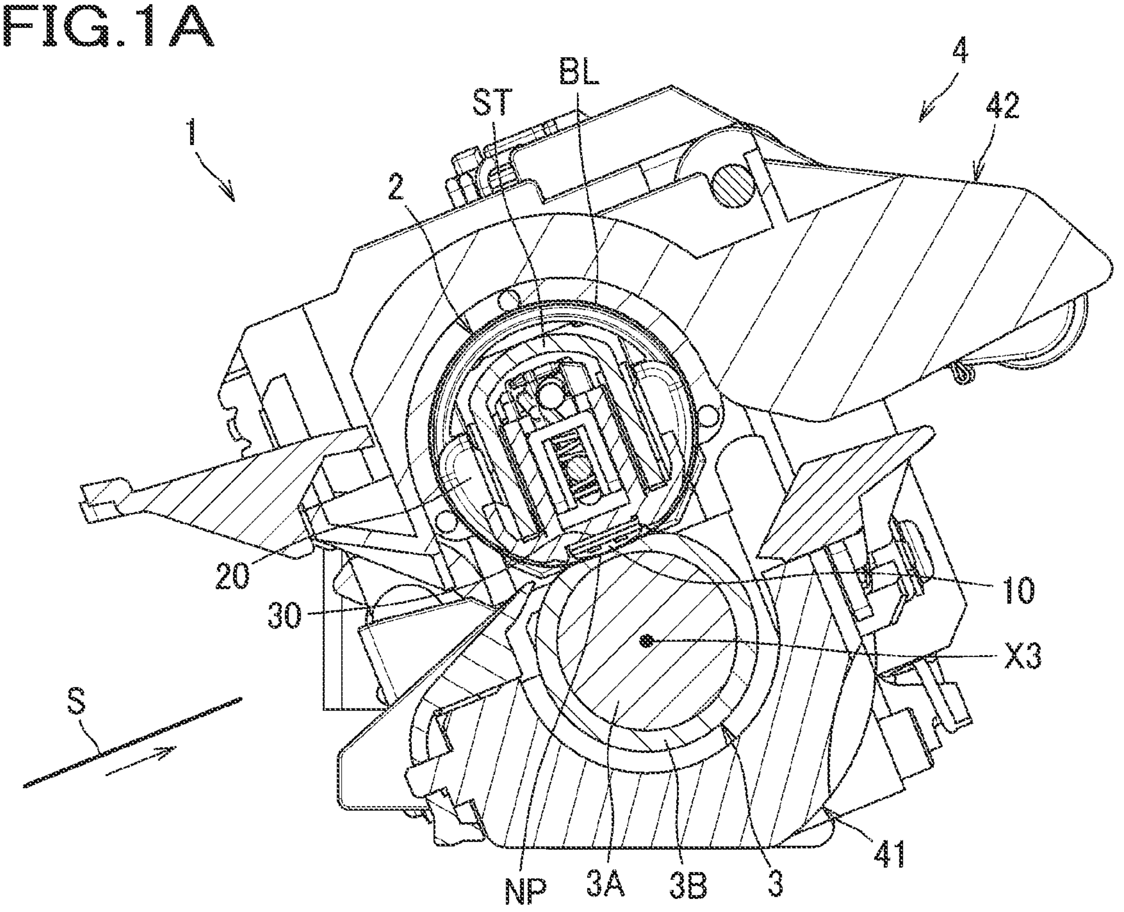
FIG. 1A is a cross-sectional view of a fixing device.

A fixing device 1 shown in FIG. 1A is a device for fixing a toner image onto a sheet S. The fixing device 1 is installed in an image forming apparatus such as a printer. The fixing device 1 comprises a heating unit 2, a pressure roller 3 as an example of a second rotating body, and a frame 4.

The pressure roller 3 is rotatable about a third axis X3. The pressure roller 3 can nip a sheet S in combination with the heating unit 2. The pressure roller 3 comprises a shaft 3A having a cylindrical shape and a roller portion 3B having a hollow cylindrical shape. The shaft 3A is made, for example, of metal. The roller portion 3B is made, for example, of rubber. The roller portion 3B covers a part of the shaft 3A. The pressure roller 3 forms a nip NP in combination with the heating unit 2. The nip NP is formed between the pressure roller 3 and the heating unit 2.

The heating unit 2 comprises a heater 10, a holder 20, a thermally-conductive member 30, a stay ST, and a belt BL as an example of a first rotational member. The heater 10 heats the belt BL which in turn heats the sheet S.

Figure 1B:
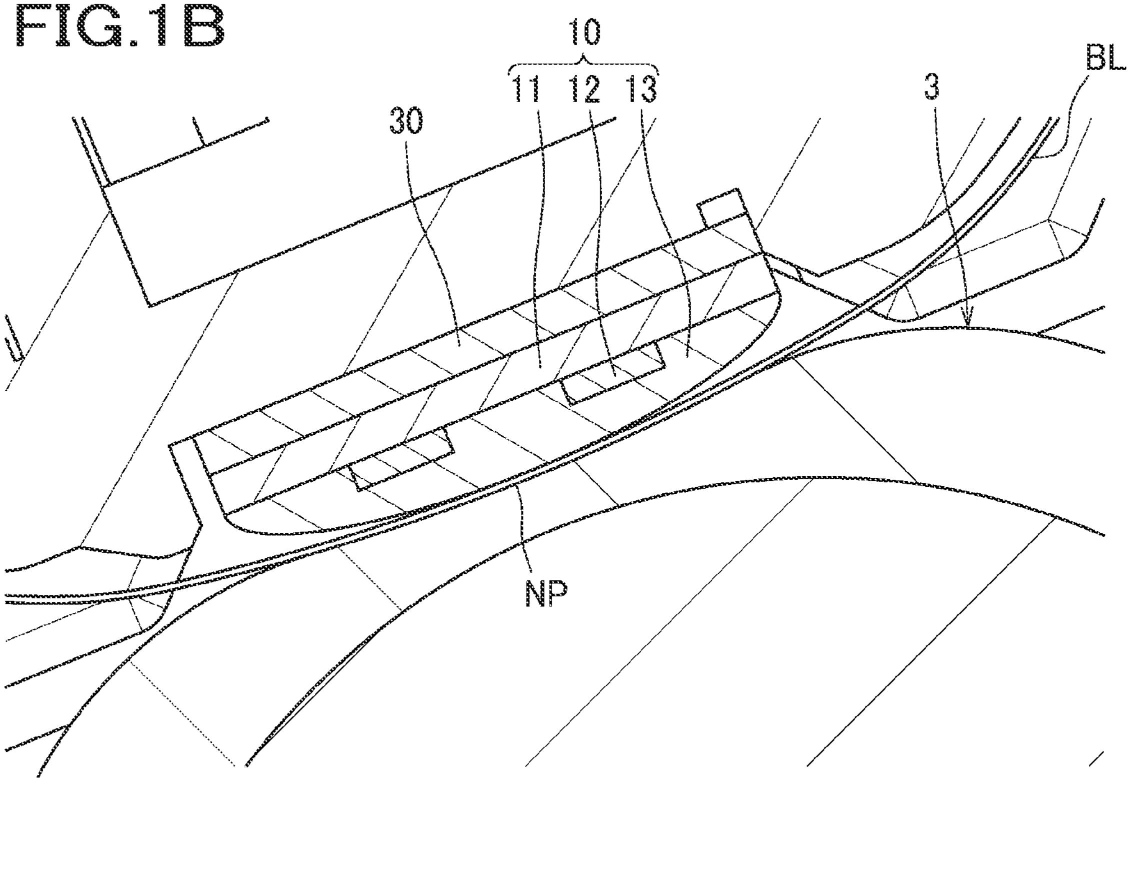
FIG. 1B is an enlarged cross-sectional view of a heater and components in the vicinity thereof.
Figures 2A, 2B, 2C:
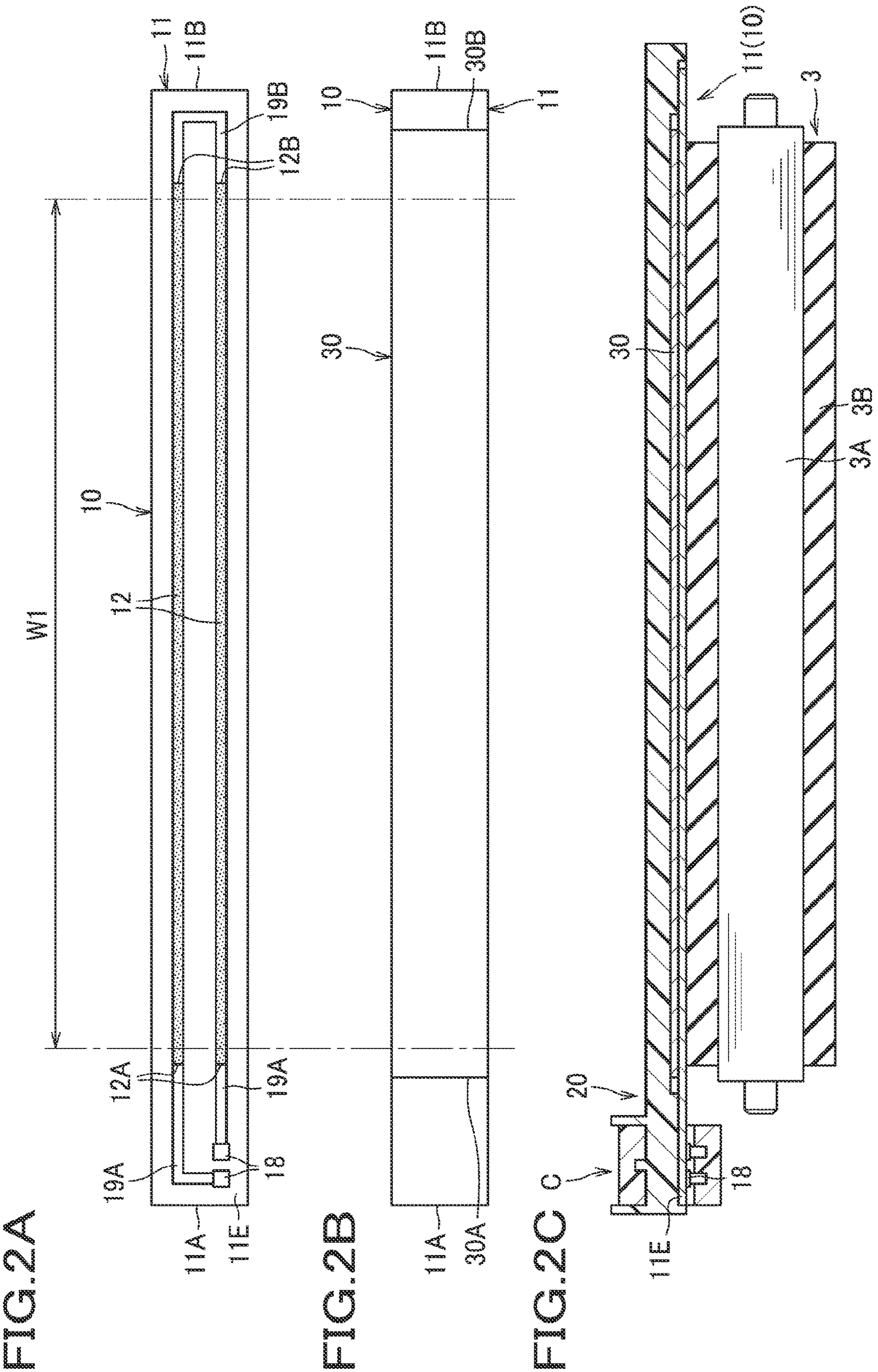
FIG. 2A is an illustration showing a side of the heater on which a resistance heating element is disposed.
FIG. 2B is an illustration of the heater and a thermally-conductive member as viewed from the backside.
FIG. 2C is a longitudinal-sectional view of the heater and other components.

As shown in FIG. 1B, the heater 10 comprises a substrate 11, a resistance heating element 12 disposed on the substrate 11, and a cover 13. The substrate 11 is comprised of an elongated rectangular plate formed of ceramic made of aluminum oxide. The heater 10 is a so-called ceramic heater. The resistance heating element 12 is formed on one side of the substrate 11 by printing. As shown in FIG. 2A, in the illustrated example, two resistance heating elements 12 are provided. The resistance heating elements 12 are elongated in a longitudinal direction of the heater 10 and are parallel to and spaced apart from each other in a widthwise direction perpendicular to the longitudinal direction. One end of a corresponding conductor 19A is connected to one end 12A of each resistance heating element 12. A power-supply terminal 18 for providing electricity to the resistance heating elements 12 is disposed at the other end of each conductor 19A.

The power-supply terminals 18 are electrically connected to the resistance heating elements 12 via the conductors 19A. The power-supply terminals 18 are located at one end 11E of the substrate 11. As shown in FIG. 2C, a connector C for providing electricity to the heater 10 is connected to the power-supply terminals 18. The connector C is attachable to and removable from one end of the heater 10. Electricity is provided to the power-supply terminals 18 from the connector C. In FIG. 2C, the resistance heating elements 12, the cover 13, and the belt BL are omitted for clarity.

The other ends 12B of the resistance heating elements 12 are connected to one another by a conductor 19B. It is to be understood that any number of resistance heating elements 12 may be provided. Further, it is possible to provide a resistance heating element with an amount of heat generation at a middle portion thereof larger than amounts of heat generation at end portions thereof in the longitudinal direction, and a resistance heating element with amounts of heat generation at end portions thereof larger than an amount of heat generation at a middle portion thereof in the longitudinal direction and adjust heating distribution in the longitudinal direction by individually controlling each resistance heating element.

As shown in FIG. 1B, the cover 13 covers the resistance heating elements 12. The cover 13 is made, for example, of glass.

As shown in FIG. 1A, the holder 20 has functions of supporting the heater 10 and guiding the belt BL. The holder 20 is made, for example, of plastic.

The stay ST supports the holder 20. The stay ST is made, for example, of metal.

The belt BL is an endless belt and is made of metal or plastic or the like. The belt BL rotates around the heater 10 while being guided by the holder 20. The belt BL has an outer peripheral surface and an inner peripheral surface. The outer peripheral surface contacts the pressure roller 3 or a sheet S which is the object to be heated. The inner peripheral surface contacts the heater 10.

The thermally-conductive member 30 is a member for conducting heat in the heater 10 along the length to equalize a temperature of the heater 10 in the longitudinal direction. The thermally-conductive member 30 is a plate-shaped member located between the heater 10 and the holder 20. When the heating unit 2 nips a sheet S in combination with the pressure roller 3, the thermally-conductive member 30 is nipped between the heater 10 and the holder 20. The thermally-conductive member 30 is made, for example, of aluminum.

As shown in FIGS. 2A and 2B, the one end 12A and the other end 12B of each resistance heating element 12 are located in positions outside an area through which a sheet with a maximum width W1 conveyable in the heating unit 2 can pass, and closer to a center of the substrate 11 than a corresponding end 30A, 30B of the thermally-conductive member 30. In other words, the thermally-conductive member 30 is longer than the resistance heating elements 12 in the longitudinal direction.

The substrate 11 is longer than the thermally-conductive member 30 in the longitudinal direction. The one end 30A of the thermally-conductive member 30 is located closer, in the longitudinal direction, to the center of the substrate 11 than one end 11A of the substrate 11. The other end 30B of the thermally-conductive member 30 is located closer, in the longitudinal direction, to the center of the substrate 11 than the other end 11B of the substrate 11.

Figure 5:
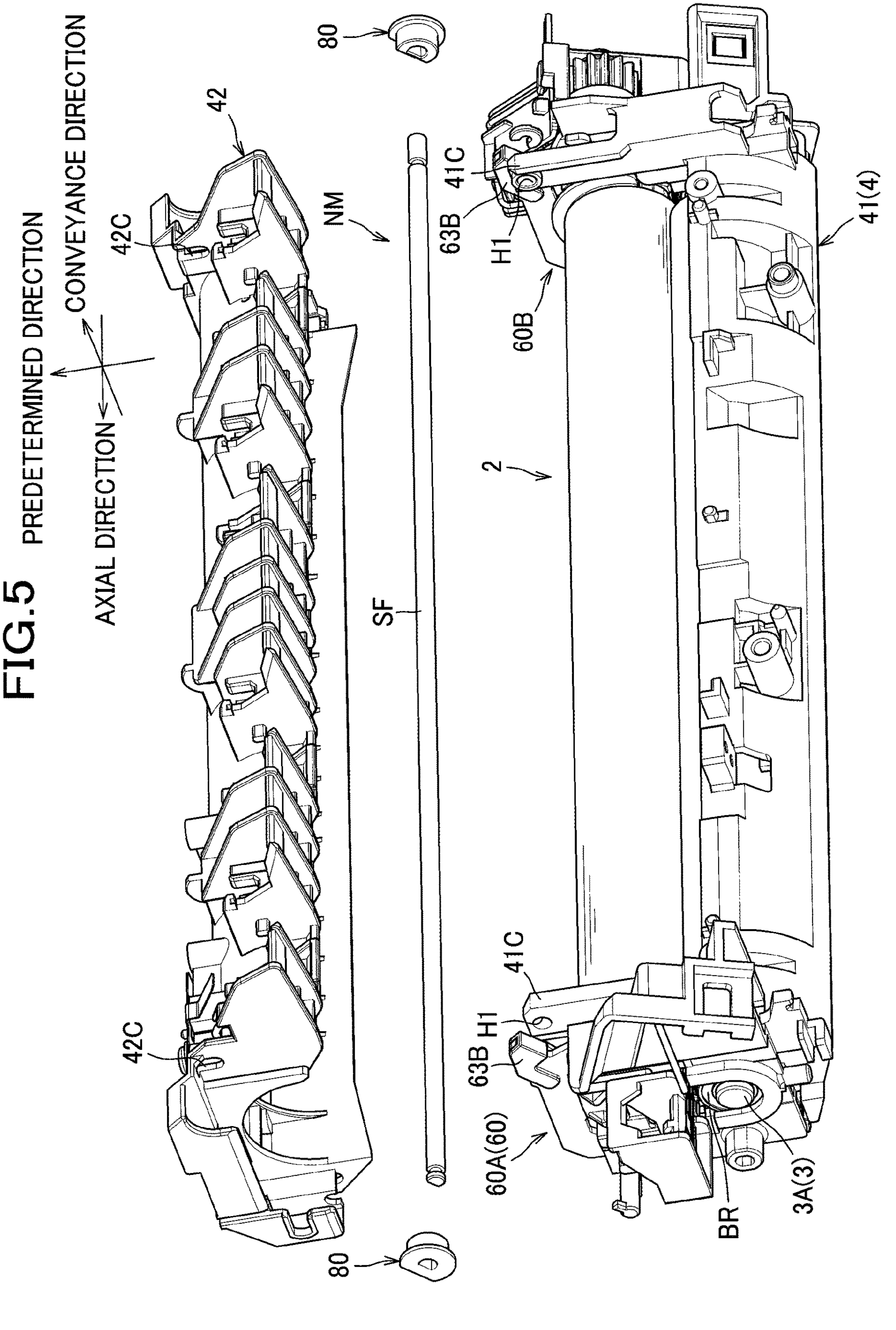
FIG. 5 is a partially exploded perspective view showing a frame and the nip pressure changing mechanism.

As shown in FIG. 5, the frame 4 has a first end and a second end located apart from each other in the longitudinal direction of the frame 4. The frame 4 comprises a first frame 41 and a second frame 42. The first frame 41 supports the heating unit 2 and the pressure roller 3. The second frame 42 is attached to the first frame 41 and covers the heating unit 2 from a side thereof opposite to a side on which the pressure roller 3 is located.

The first frame 41 has a first end and a second end corresponding to the first end and the second end of the frame 4 (i.e., located apart from each other in an axial direction of the pressure roller 3). The first frame 41 supports the pressure roller 3 via bearings BR. The bearings BR are respectively disposed at the first end and the second end of the first frame 41.

The heating unit 2 is supported by the first frame 41 in a manner movable in a predetermined direction. In the following description, the axial direction of the pressure roller 3 is referred to simply as "axial direction". The direction of conveyance of a sheet S through the nip NP is referred to simply as "conveyance direction". In this example, the conveyance direction of a sheet S through the nip NP is perpendicular to the axial direction and to the predetermined direction. Further, each of the arrows indicating directions in the drawings point in one direction. Particularly, the arrow indicating the conveyance direction points downstream in the direction of conveyance of a sheet S.

Figure 3:
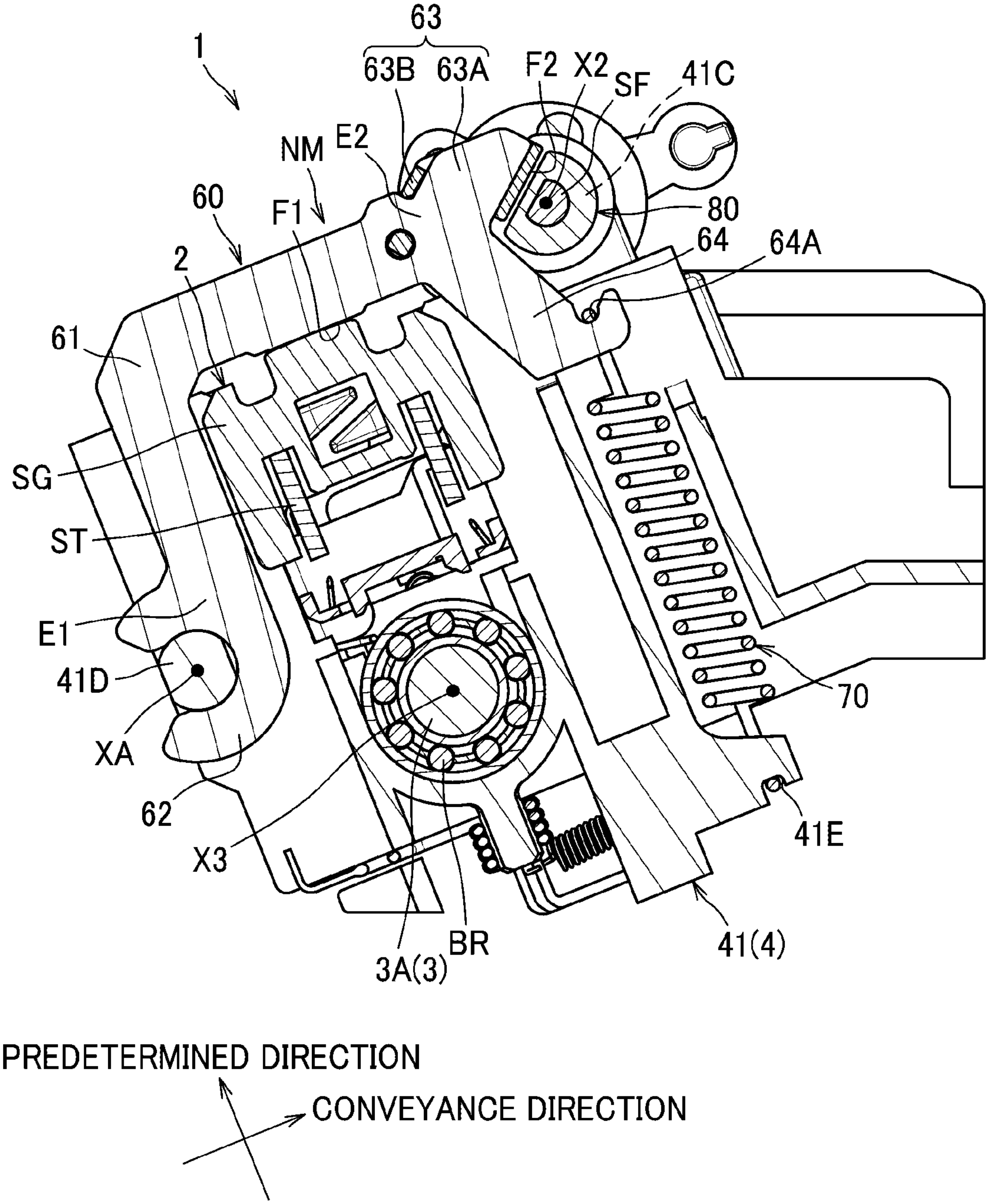
FIG. 3 is a cross-sectional view showing a nip pressure changing mechanism as observed when a nip pressure is adjusted to a first nip pressure.

As shown in FIG. 3, the fixing device 1 further comprises a nip pressure changing mechanism NM for changing a nip pressure in the nip NP between the heating unit 2 and the pressure roller 3. The nip pressure changing mechanism NM comprises a shaft SF, a pair of pressure arms 60, a pair of pressure springs 70, and a pair of cams 80. The pressure springs 70 are supported by the first frame 41. The pressure arms 60 and the cams 80 are rotatably supported by the first frame 41.

As shown in FIG. 5, one of the pressure arms 60 and one of the cams 80 are disposed at the first end of the first frame 41, and the other of the pressure arms 60 and the other of the cams 80 are disposed at the second end of the first frame 41. Although not shown in the drawings, one of the pressure springs 70 is disposed at the first end of the first frame 41, and the other of the pressure springs 70 is disposed at the second end of the first frame 41.

In the following description, the pressure arm 60 disposed at the first end of the frame 4 is also referred to as "first pressure arm 60A". The pressure arm 60 disposed at the second end of the frame 4 is also referred to as "second pressure arm 60B". Herein, the longitudinal direction of the frame 4 is parallel to the axial direction.

The shaft SF extends in the axial direction. The shaft SF is made, for example, of metal. One of the cams 80 is fixed on one end of the shaft SF, and the other of the cams 80 is fixed on the other end of the shaft SF. In other words, the pair of cams 80 includes the shaft SF. The cams 80 rotate as the shaft SF rotates. The first frame 41 includes a pair of support portions 41C which supports the shaft SF in a manner that allows the shaft SF to rotate. One of the support portions 41C is disposed at the first end of the first frame 41, and the other of the support portions 41C is disposed at the second end of the first frame 41. Each support portion 41C has a hole H1 for supporting the shaft SF in a manner that allows the shaft SF to rotate.

Figure 6:
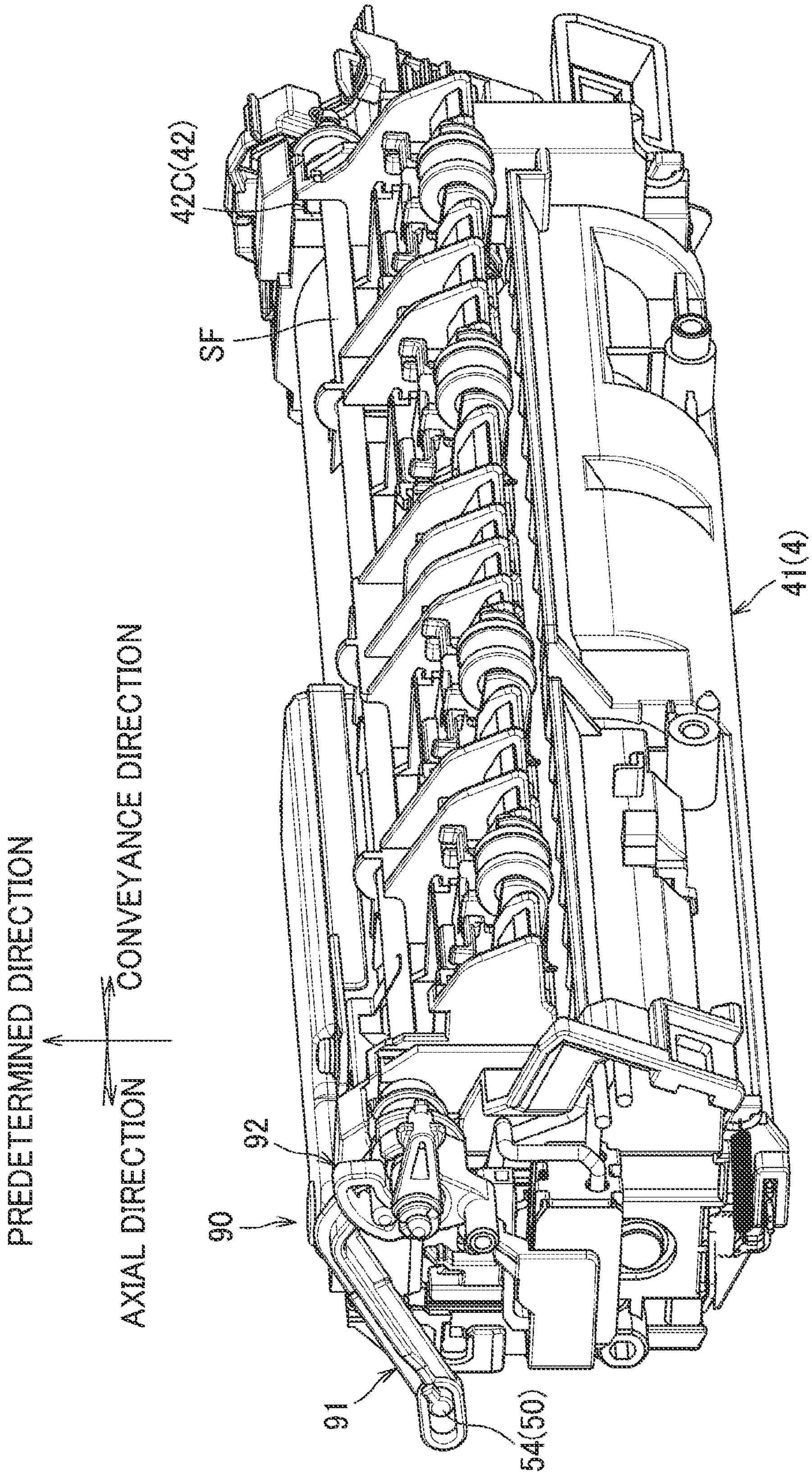
FIG. 6 is a perspective view of the fixing device as viewed from a downstream side thereof in a direction of conveyance.

The second frame 42 has a first end and a second end corresponding to the first end and the second end of the frame 4 (i.e., located apart from each other in the axial direction). The second frame 42 comprises a pair of recesses 42C that support the shaft SF in a manner that allows the shaft to rotate (see also FIG. 6). One of the recesses 42C is disposed at the first end of the second frame 42, and the other of the recesses 42C is disposed at the second end of the second frame 42. The second frame 42 holds the shaft SF in combination with the first frame 41. The shaft is held between the first frame 41 and the second frame 42.

As shown in FIG. 3, the shaft SF is supported by the frame 4 in a manner rotatable about a second axis X2.

Since the structures on one side and the other side of the nip pressure changing mechanism NM in the axial direction are approximately the same, the structure on the one side will be mainly described below as an illustrative example. The pressure arm 60 is an arm that presses the heating unit 2 against the pressure roller 3. The first frame 41 comprises a first support portion 41D that supports the pressure arm 60 in a manner that allows the pressure arm 60 to rotate about an axis XA. The first support portion 41D is a protrusion having an approximately cylindrical shape. The axis XA, the second axis X2, and the third axis X3 are respectively located at different positions. The axis XA, the second axis X2, and the third axis X3 are parallel to each other.

The pressure spring 70 is a tension coil spring that biases the pressure arm 60 toward the pressure roller 3. The direction in which the pressure spring 70 biases the pressure arm 60 is approximately parallel to the predetermined direction. The first frame 41 includes a first spring hook 41E on which one end of the pressure spring 70 is hooked.

Figure 4:
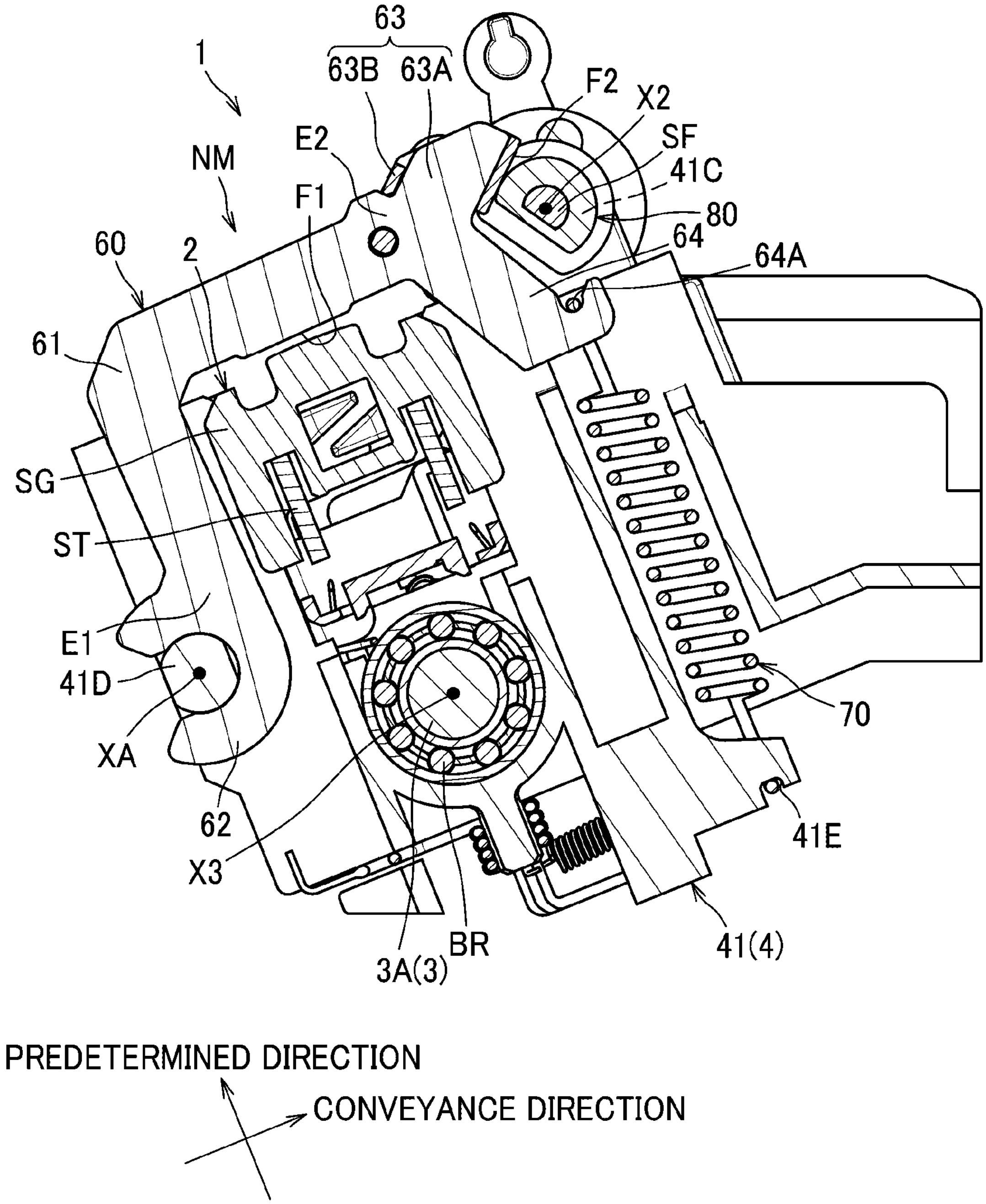
FIG. 4 is a cross-sectional view showing the nip pressure changing mechanism as observed when a nip pressure is adjusted to a second nip pressure.

The cam 80 can press the pressure arm 60 against the biasing force of the pressure spring 70. Specifically, the cam 80 is rotatable between a first position shown in FIG. 3 and a second position shown in FIG. 4.

When the cam 80 is located in the first position, the nip pressure is adjusted to a first nip pressure. When the cam 80 is located in the second position, the nip pressure is adjusted to a second nip pressure smaller than the first nip pressure.

The pressure arm 60 comprises a body portion 61, a supported portion 62, a first end portion 63, and a second end portion 64. The first end portion 63 includes a base 63A made of metal and a cam follower 63B made of plastic (see also FIG. 5). The body portion 61, the supported portion 62, the base 63A, and the second end portion 64 are made of metal and are integrally formed in one piece. The cam follower 63B is fitted onto the base 63A.

The body portion 61 has a first end E1 and a second end E2. The body portion 61 extends from the first end E1 in the predetermined direction, and then extends in the conveyance direction. The downstream end of the body portion 61 in the conveyance direction forms the second end E2. The body portion 61 has a pressure surface F1 between the first end E1 and the second end E2, which presses the heating unit 2 against the pressure roller 3.

In the meantime, the heating unit 2 comprises side guides SG disposed on both ends of the heating unit 2 located apart from each other in the axial direction. The side guides SG support respective ends of the stay ST located apart from each other in the axial direction. The side guides SG are movably supported by the first frame 41. The pressure surface F1 presses a corresponding side guide SG toward the pressure roller 3.

The supported portion 62 is located at the first end E1 of the body portion 61. The supported portion 62 is supported by the first support portion 41D of the first frame 41.

The first end portion 63 is located at the second end E2 of the body portion 61. The first end portion 63 has a surface F2 to be pressed by the cam 80. Specifically, the base 63A extends from the second end E2 in a direction inclined to one side away from the pressure roller 3 relative to the conveyance direction in such a manner that the farther from the second end E2 in the conveyance direction, the farther the base 63A is located from the second end E2 in the predetermined direction. The cam follower 63B attached to the base 63A includes the surface F2 to be pressed by the cam 80.

The second end portion 64 is located at the second end E2 of the body portion 61. The second end portion 64 extends from the second end E2 in a direction different from a direction in which the first end portion 63 extends. The second end portion 64 includes a second spring hook 64A on which the other end of the pressure spring 70 is hooked.

Figure 7A:
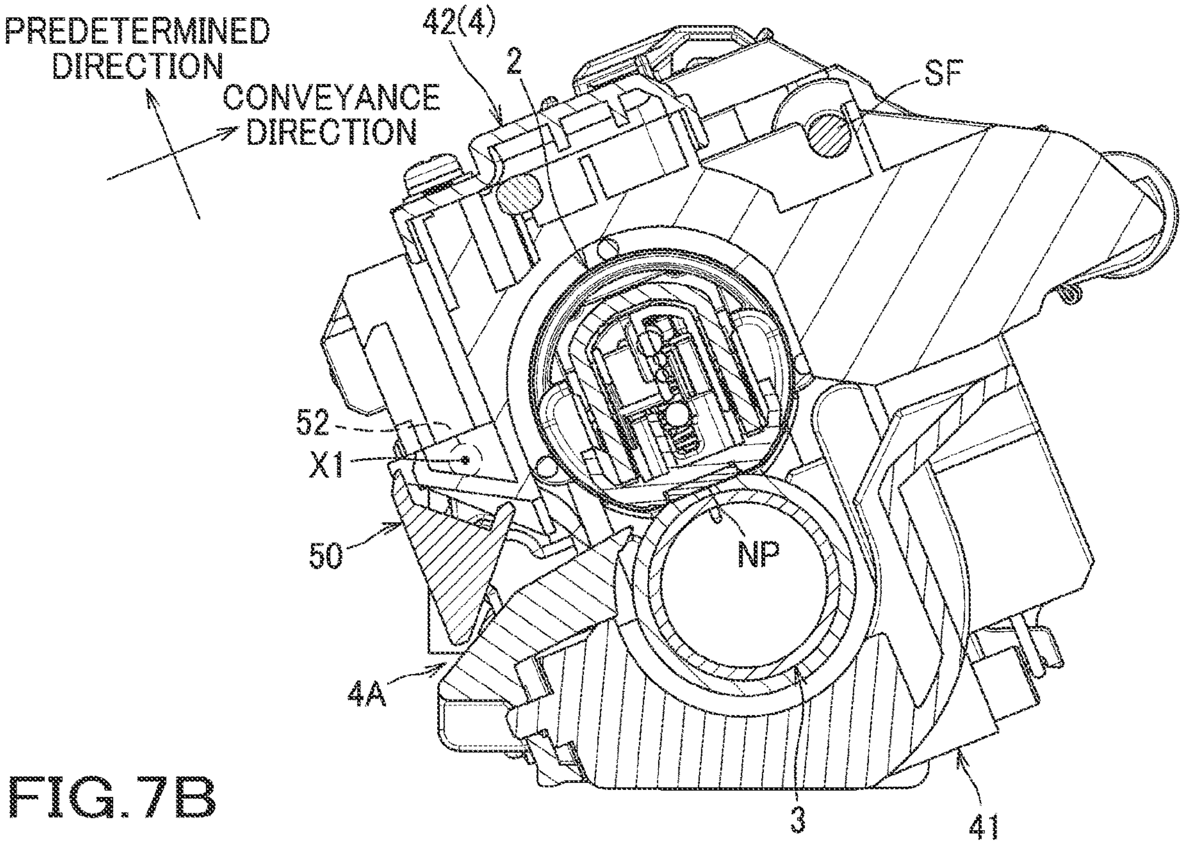
FIG. 7A is a cross-sectional view of the fixing device showing a shutter in a closed position.
Figure 7B:
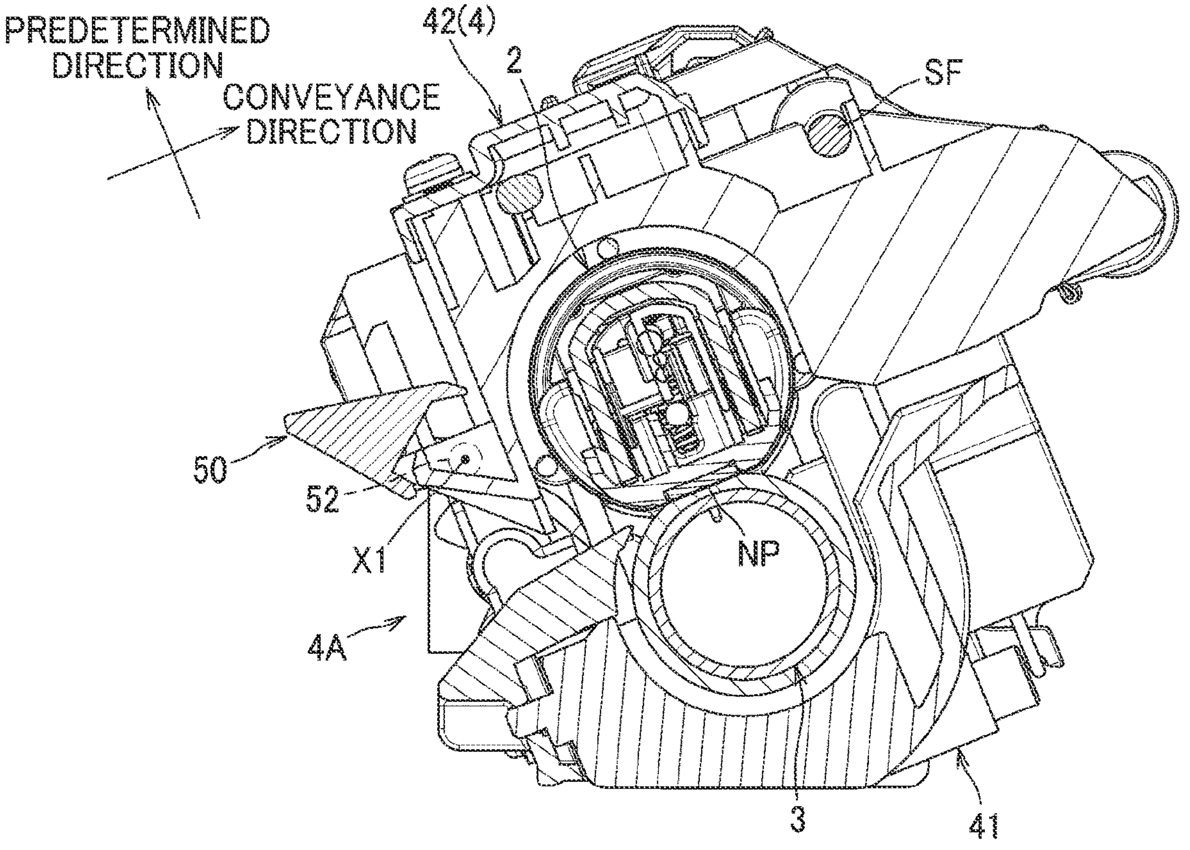
FIG. 7B is a cross-sectional view of the fixing device showing the shutter in an open position.

As shown in FIG. 7, the frame 4 has an opening 4A. The opening 4A is an opening through which a sheet S conveyed toward the nip NP passes. The opening 4A is located at an upstream side of the nip NP in the conveyance direction.

The fixing device 1 further comprises a shutter 50. The shutter 50 is rotatable about a first axis X1 between a closed position shown in FIG. 7A and an open position shown in FIG. 7B. When the shutter 50 is located in the closed position, the opening 4A is covered by the shutter 50. When the shutter 50 is located in the open position, the opening 4A is uncovered. The shutter 50 is rotatably supported by the second frame 42 via a pair of bosses 52 which will be described later. The bosses 52 are located on the upstream side of the nip NP in the conveyance direction. The shaft SF is located on a downstream side of the nip NP in the conveyance direction. That is, the second axis X2 is located on the downstream side of the nip NP in the conveyance direction.

Figure 8A:
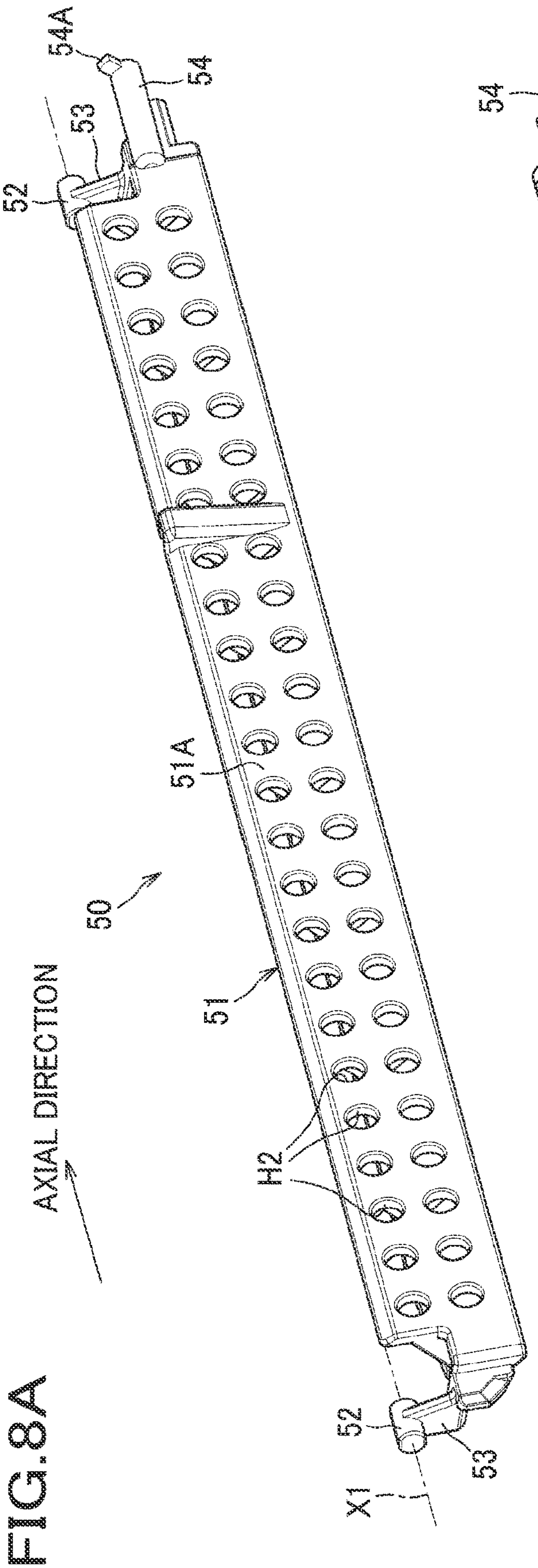
FIG. 8A is a perspective view of the shutter showing a first-plate-portion side of the shutter.
Figure 8B:
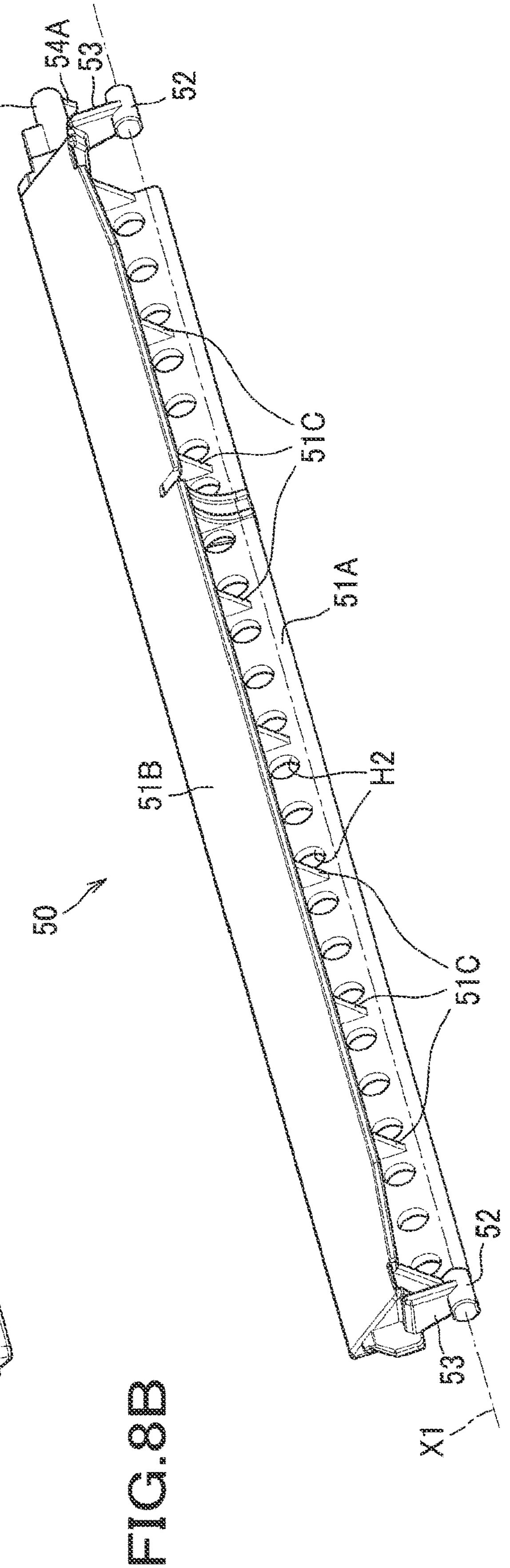
FIG. 8B is a perspective view of the shutter showing a second-plate-portion side of the shutter.

As shown in FIG. 8, the shutter 50 comprises a shutter body 51, a pair of bosses 52, a pair of connection portions 53, and a protrusion 54. The shutter 50 is made of plastic or the like. The shutter body 51, the bosses 52, the connection portions 53, and the protrusion 54 are integrally formed in one piece.

The shutter body 51 has a first end and a second end located apart from each other in the axial direction. The shutter body 51 includes a first plate portion 51A, a second plate portion 51B, and a plurality of ribs 51C. The first plate portion 51A is a plate-shaped part elongated in the axial direction. The first plate portion 51A has a plurality of apertures H2. The plurality of apertures H2 are arranged in a matrix of apertures with rows aligned in the widthwise direction of the first plate portion 51A and columns aligned in the longitudinal direction of the first plate portion 51A.

The second plate portion 51B is a plate-shaped part elongated in the axial direction. The second plate portion 51B does not have any apertures. One side edge of the second plate portion 51B is connected to one side edge of the first plate portion 51B.

The plurality of ribs 51C are located between the first plate portion 51A and the second plate portion 51B. The plurality of ribs 51C connect the first plate portion 51A and the second plate portion 51B.

One of the bosses 52 is disposed at the first end of the shutter body 51, and the other of the bosses 52 is disposed at the second end of the shutter body 51. The bosses 52 have cylindrical shapes. The center of each boss 52 coincides with the first axis X1.

The connection portions 53 connect the respective bosses 52 to the shutter body 51. One of the connection portions 53 is disposed at the first end of the shutter body 51, and the other of the connection portions 53 is disposed at the second end of the shutter body 51.

The protrusion 54 is disposed at the first end of the shutter body 51. Specifically, the protrusion 54 extends in the axial direction from one end of the first plate portion 51A facing in the axial direction. The protrusion 54 is located in a position shifted from the positions of the bosses 52 in a direction perpendicular to the axial direction.

The protrusion 54 includes a retainer portion 54A. The retainer portion 54A is located at an end of the protrusion 54. The retainer portion 54A protrudes from an outer peripheral surface of the protrusion 54.

Figure 9:
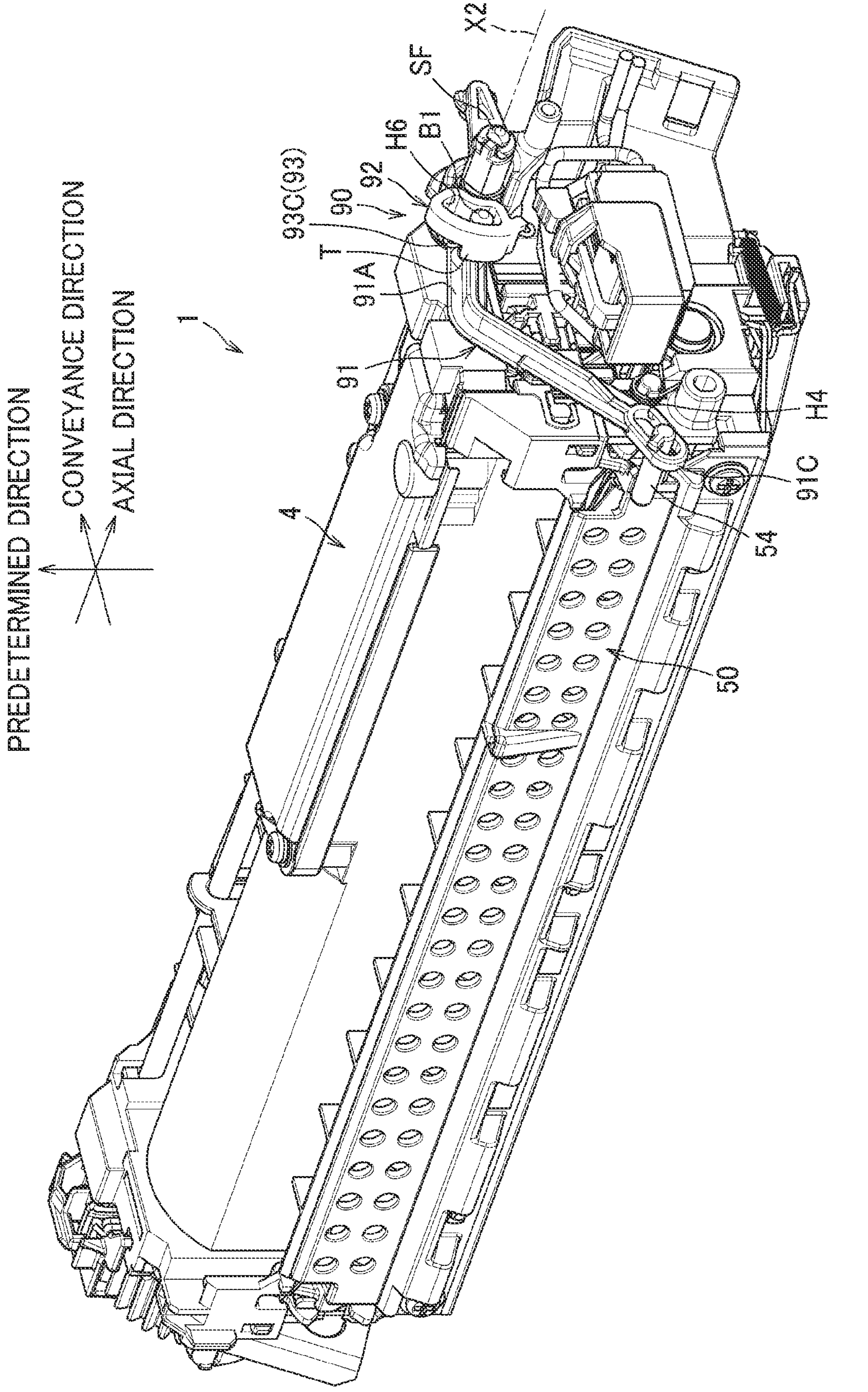
FIG. 9 is a perspective view of the fixing device as observed when the shutter is located in the closed position, showing an upstream side thereof facing upstream in the direction of conveyance.
Figure 10:
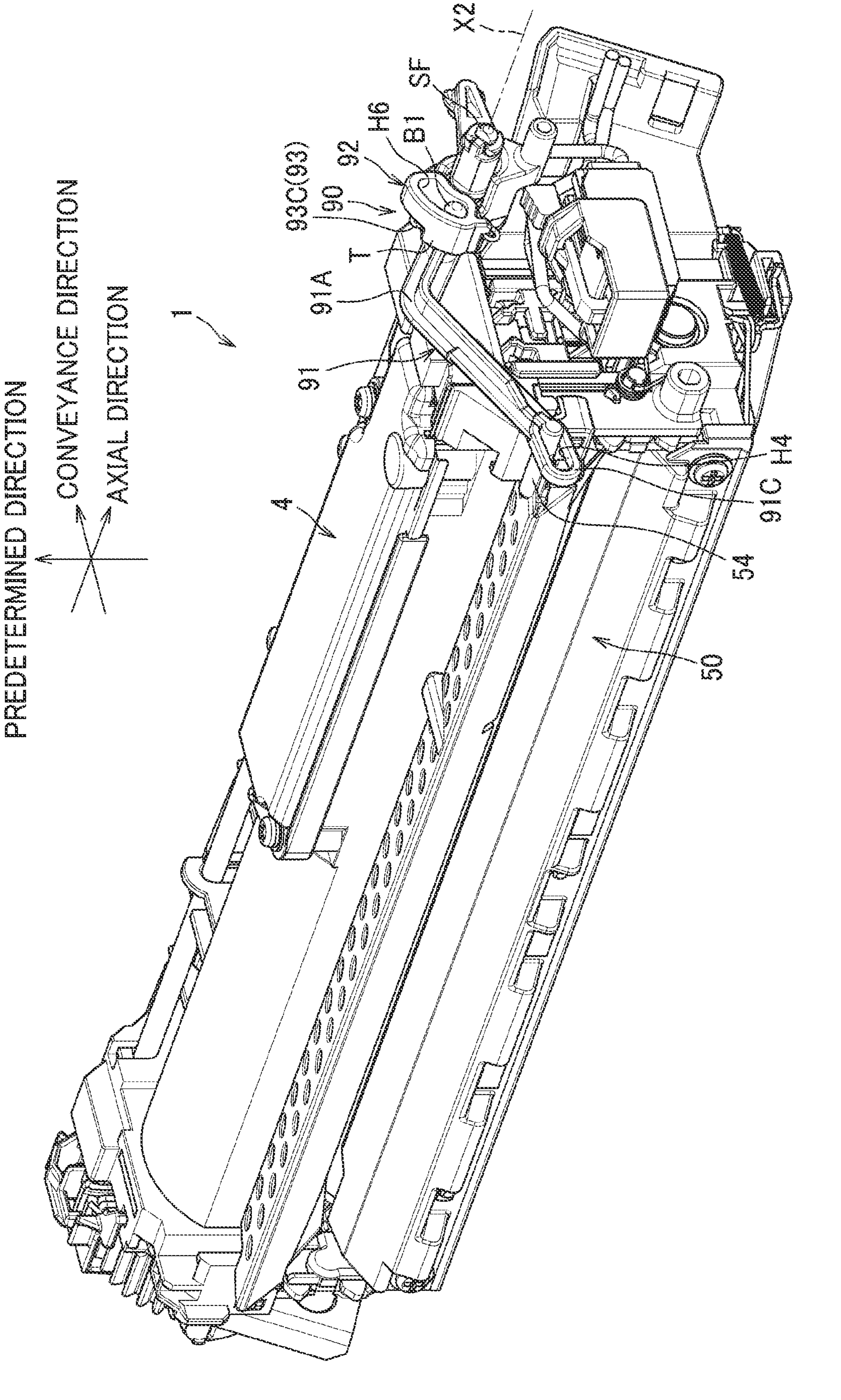
FIG. 10 is a perspective view of the fixing device as observed when the shutter is located in the open position, showing the upstream side thereof.
Figure 11:
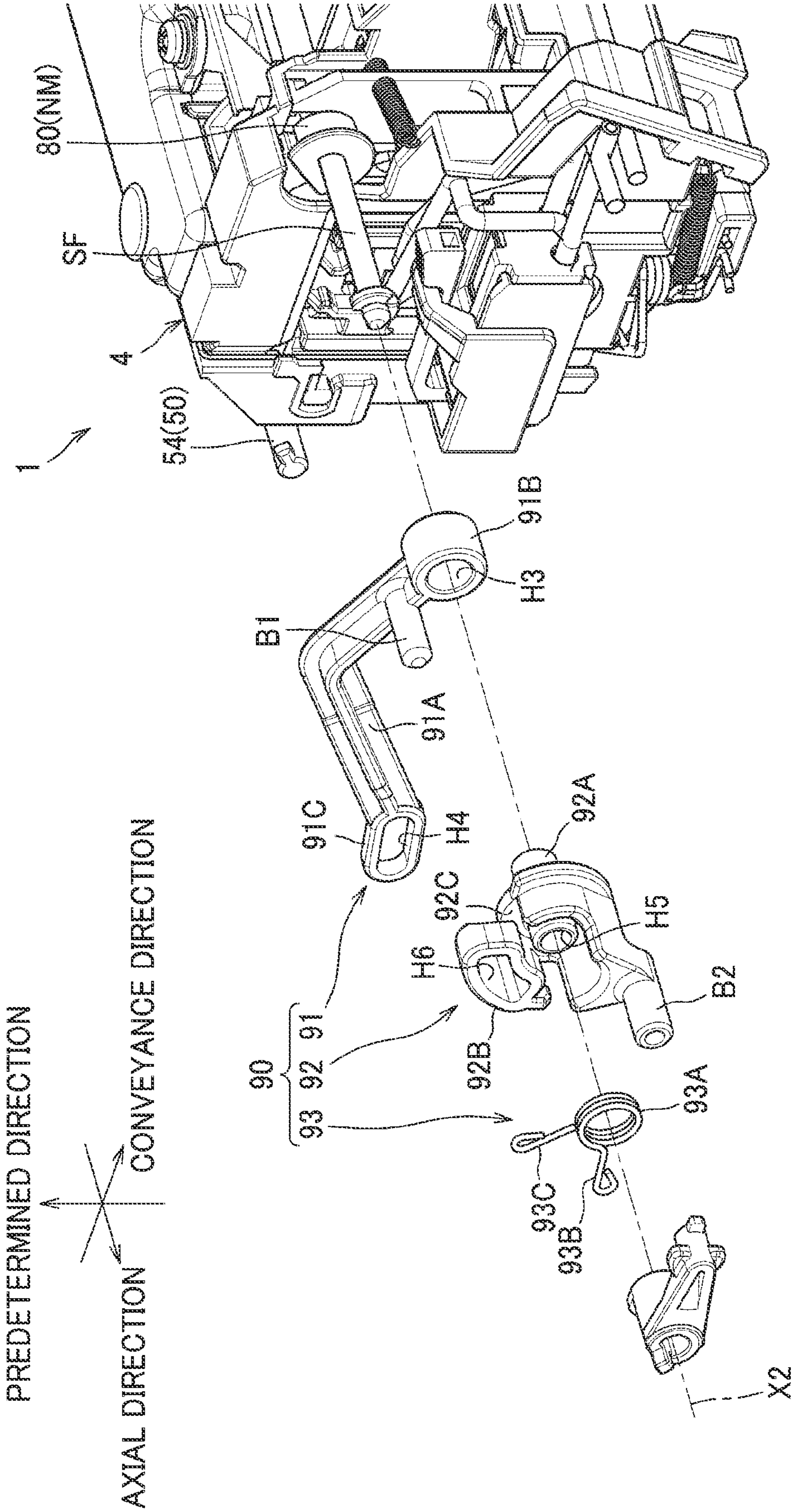
FIG. 11 is a perspective view of one end of the fixing device showing the shutter actuation mechanism disassembled.

As shown in FIGS. 9 and 10, the fixing device 1 further comprises a shutter actuation mechanism 90 for opening/closing the shutter 50. As shown in FIG. 11, the shutter actuation mechanism 90 comprises a shutter arm 91, an arm cam 92, and a spring 93. The shutter arm 91 and the arm cam 92 are made of plastic or the like. The spring 93 is made of metal or the like.

The shutter arm 91 rotates about the second axis X2 and thereby performs a function of rotating the shutter 50 between the closed position and the open position (see FIGS. 9 and 10). The shutter arm 91 includes an arm body 91A, a first connection portion 91B, and a second connection portion 91C. The arm body 91A, the first connection portion 91B, and the second connection portion 91C are integrally formed in one piece.

The first connection portion 91B has a hole H3 in which a hollow cylindrical portion 92A of the arm cam 92 is received. The first connection portion 91B is connected to the shaft SF via the hollow cylindrical portion 92A. The first connection portion 91B is rotatably supported by the shaft SF via the hollow cylindrical portion 92A. The shutter arm 91 is thereby rotatable about the second axis X2. Further, the shutter arm 91 is rotatable independently of the shaft SF.

The second connection portion 91C has an elongated hole H4 in which the protrusion 54 of the shutter 50 is received. The second connection portion 91C is connected to the protrusion 54 of the shutter 50 at the elongated hole H4.

The arm body 91A connects the first connection portion 91B and the second connection portion 91C. The arm body 91A includes a boss B1.

Figure 12A:
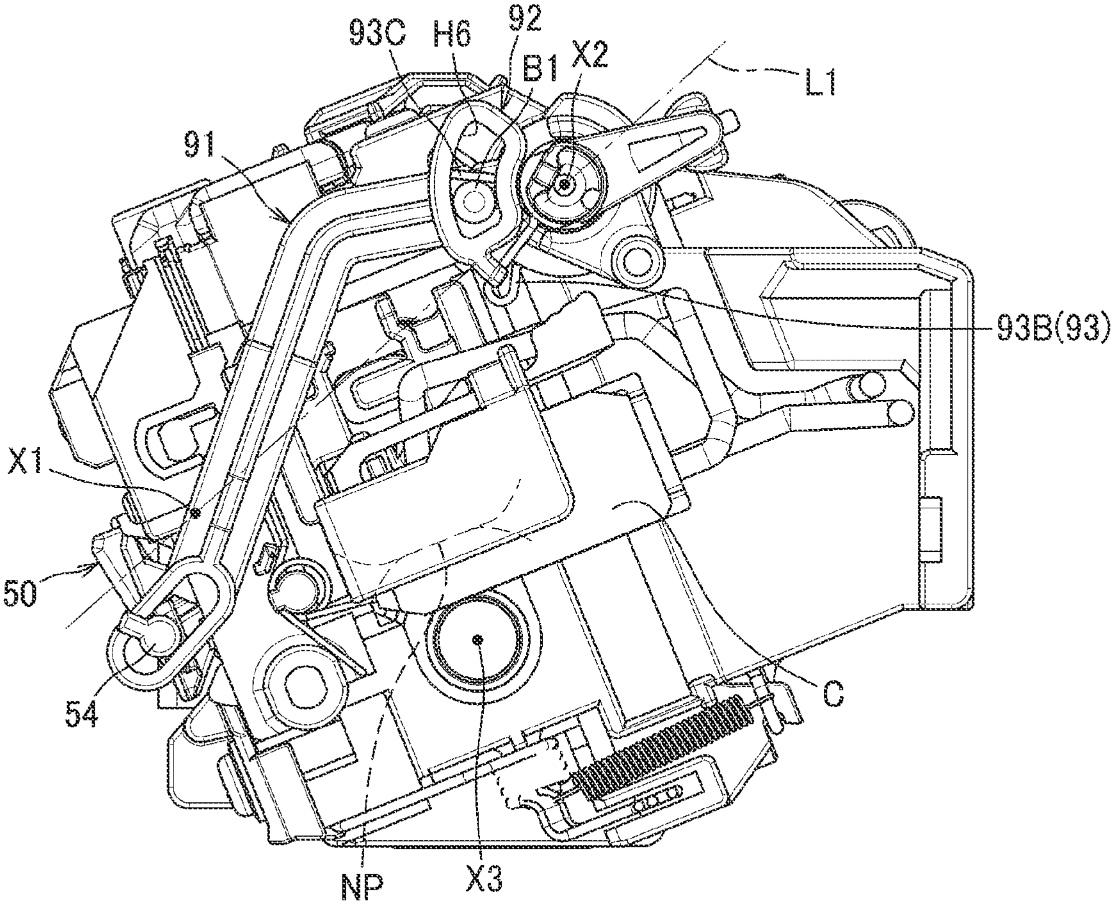
FIG. 12A is a side view of the fixing device as observed when the shutter is located in the closed position.
Figure 13A:
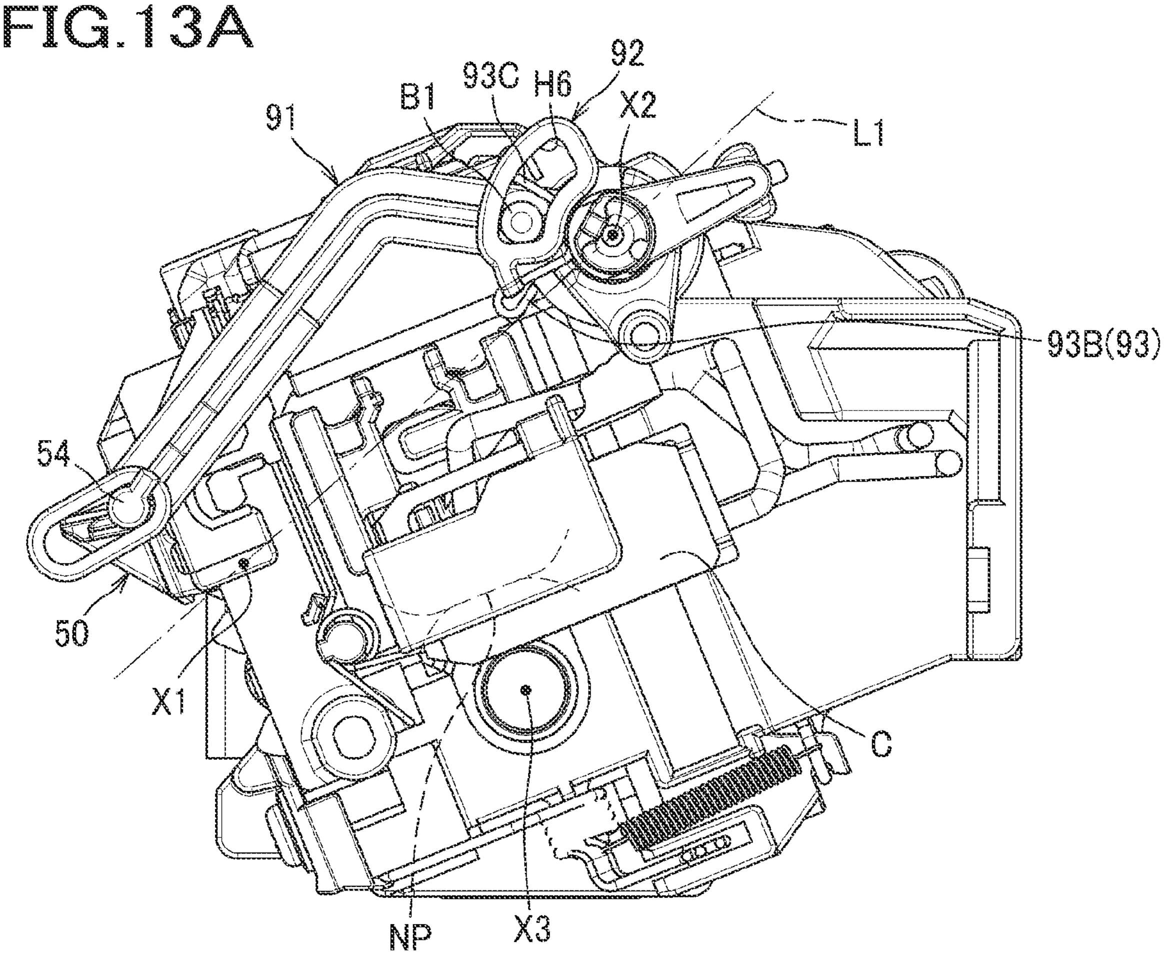
FIG. 13A is a side view of the fixing device as observed when the shutter is located in the open position.

As shown in FIG. 12A, when the shutter 50 is in the closed position, the protrusion 54 of the shutter 50 is located on a side of a straight line L1 connecting the first axis X1 and the second axis X2, on which the nip NP is located. As shown in FIG. 13A, when the shutter 50 is in the open position, the protrusion 54 of the shutter 50 is located on a side of the straight line L1 opposite to the side on which the nip NP is located. Herein, the straight line L1 indicates a plane containing the first axis X1 and the second axis X2. The shutter arm 91 is located on a side of the connector C opposite to the side on which the third axis X3 is located.

As shown in FIG. 11, the arm cam 92 is a cam that rotates about the second axis X2 to push the shutter arm 91 at a position offset from the second axis X2, and causes the shutter arm 91 to rotate about the second axis X2. Specifically, the arm cam 92 pushes the boss B1 of the shutter arm 91 in the circumferential direction. Herein, the circumferential direction is a direction along a circle with a center on the second axis X2. The arm cam 92 includes a hollow cylindrical portion 92A, a pressure portion 92B, a boss B2, and a connection portion 92C. The hollow cylindrical portion 92A, the pressure portion 92B, the boss B2, and the connection portion 92C are integrally formed in one piece. The pressure portion 92B and the boss B2 are connected to the hollow cylindrical portion 92A by the connection portion 92C.

The hollow cylindrical portion 92A has a hole H5 in which the shaft SF is received. The hollow cylindrical portion 92A is rotatably supported by the shaft SF. The arm cam 92 is thereby rotatable about the second axis X2. The arm cam 92 is rotatable independently of the the shaft SF. The hollow cylindrical portion 92A is received in the hole H3 of the shutter arm 91. The shutter arm 91 is rotatably supported by the hollow cylindrical portion 92A.

The boss B2 is a part to which a force is input from a connection link 200 (see FIG. 17) which will be described later. The boss B2 is located in a position shifted from the second axis X2 in a direction perpendicular to the axial direction.

The pressure portion 92B is located at a position offset from the second axis X2. The pressure portion 92B has an elongated hole H6 in which the boss B1 of the shutter arm is received. The elongated hole H6 is formed in a shape of an arc with a center on the second axis X2. The elongated hole H6 allows change in position of the boss B1 of the shutter arm 91. The pressure portion 92B is a tubular portion that contours the arc-shaped elongated hole H6. As shown in FIG. 9, the pressure portion 92B has an inner end in the axial direction (i.e., an end facing the frame 4) of which a portion of the tubular portion defining one side of the elongated hole H6 is cut off to form a spring contact portion T contactable with the spring 93 in directions of rotation of the arm cam 92.

Figure 12B:
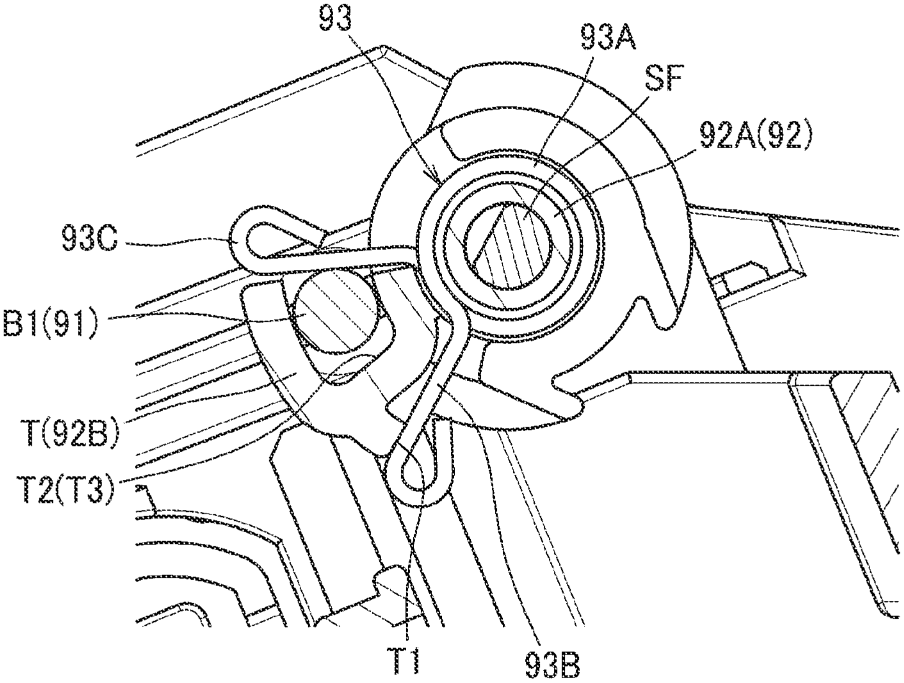
FIG. 12B is an enlarged cross-sectional view of a spring contact portion and components in the vicinity thereof.

As shown in FIG. 12B, the spring 93 is a torsion spring including a coil 93A, a first arm portion 93B, and a second arm portion 93C. The hollow cylindrical portion 92A of the arm cam 92 is located inside the coil 93A. The hollow cylindrical portion 92A supports the coil 93A. The first arm portion 93B and the second arm portion 93C form an acute angle.

The spring contact portion T is located between the first arm portion 93B and the second arm portion 93C. The spring contact portion T has a first contact surface T1 and a recess T3. The first contact surface T1 is a surface contactable with the first arm portion 93B in a direction of rotation of the arm cam 92.

The recess T3 has a shape formed by cutting off a part of the pressure portion 92B as described above. The recess T3 opens toward the second arm portion 93C. The boss B1 of the shutter arm 91 is movable in the recess T3. A bottom of the recess T3 forms a second contact surface T2 contactable with the boss B1 of the shutter arm 91 in a direction of rotation of the arm cam 92. The second contact surface T2 is located between the first contact surface T1 and the boss B1 in the directions of rotation of the arm cam 92. The boss B1 is located between the second contact surface T2 and the second arm portion 93C in the directions of rotation of the arm cam 92.

When the shutter 50 is in the closed position as shown in FIG. 12A, the first contact surface T1 of the arm cam 92 contacts the first arm portion 93B and the second arm portion 93C contacts the boss B1 of the shutter arm 91 as shown in FIG. 12B. The position at which the second arm portion 93C contacts the boss B1 of the shutter arm 91 is a position offset from the second axis X2. The arm cam 92 thereby pushes the shutter arm 91 via the spring 93 to locate the shutter 50 in the closed position.

Figure 13B:
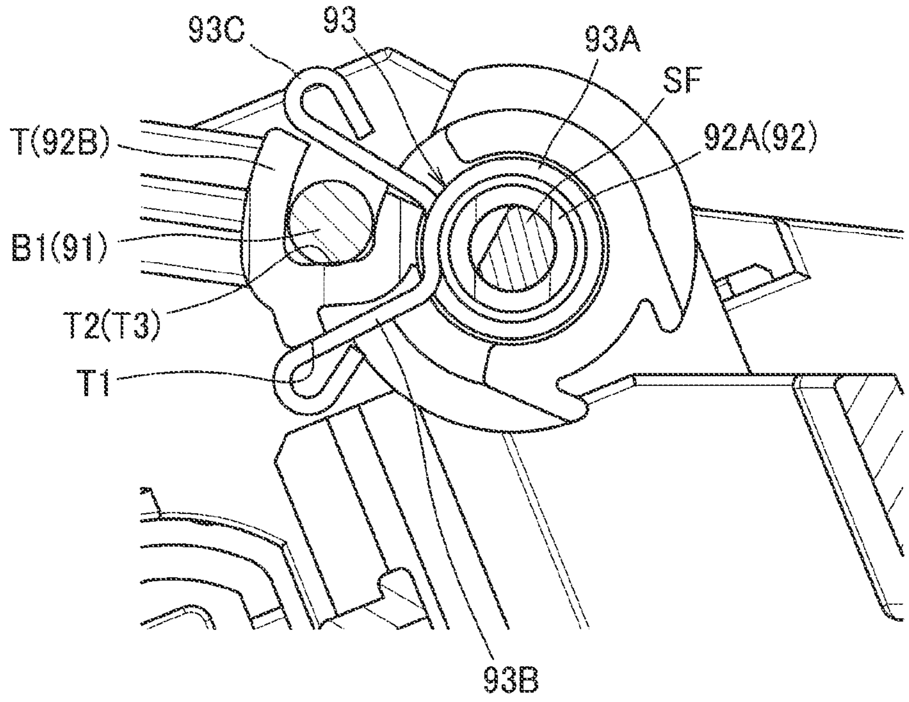
FIG. 13B is an enlarged cross-sectional view of the spring contact portion and components in the vicinity thereof.

When the shutter 50 is in the open position as shown in FIG. 13A, the second contact surface T2 of the arm cam 92 contacts the boss B1 of the shutter arm 91 as shown in FIG. 13B. The position at which the second contact surface T2 contacts the boss B1 of the shutter arm 91 is a position offset from the second axis X2. The arm cam 92 thereby contacts the shutter arm 91 to locate the shutter 50 in the open position.

Figure 14:
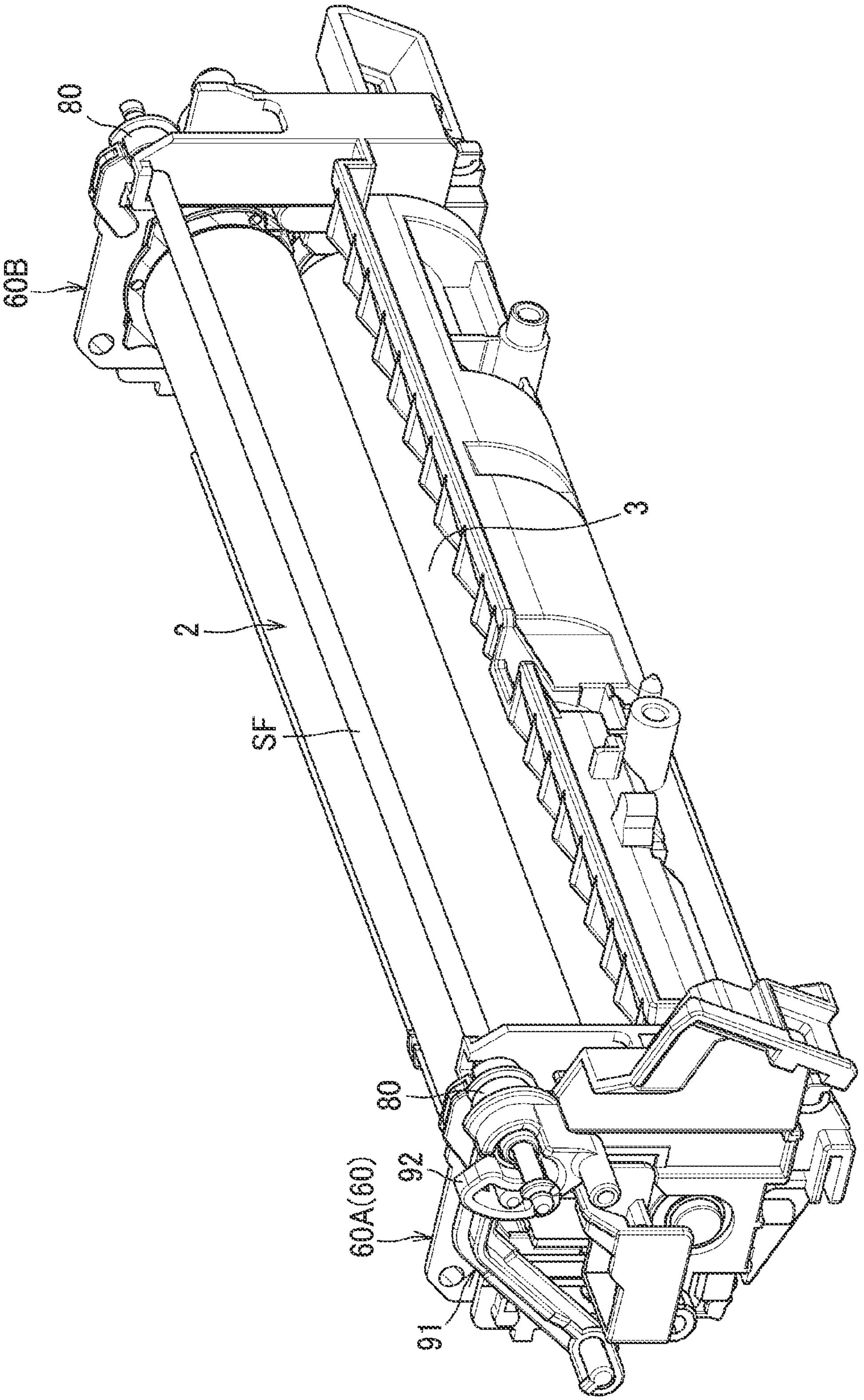
FIG. 14 is a perspective view of the fixing device showing the relationship between two pressure arms and a shutter arm.

As shown in FIG. 14, the shutter arm 91 is located in a position apart from the second pressure arm 60B farther than a position of the first pressure arm 60A in a direction parallel to the longitudinal direction, i.e., the first pressure arm 60A is located between the shutter arm 91 and the second pressure arm 60B in the direction parallel to the longitudinal direction. The shutter arm 91 is located between the arm cam 92 and the first pressure arm 60A in the axial direction.

Figure 15:
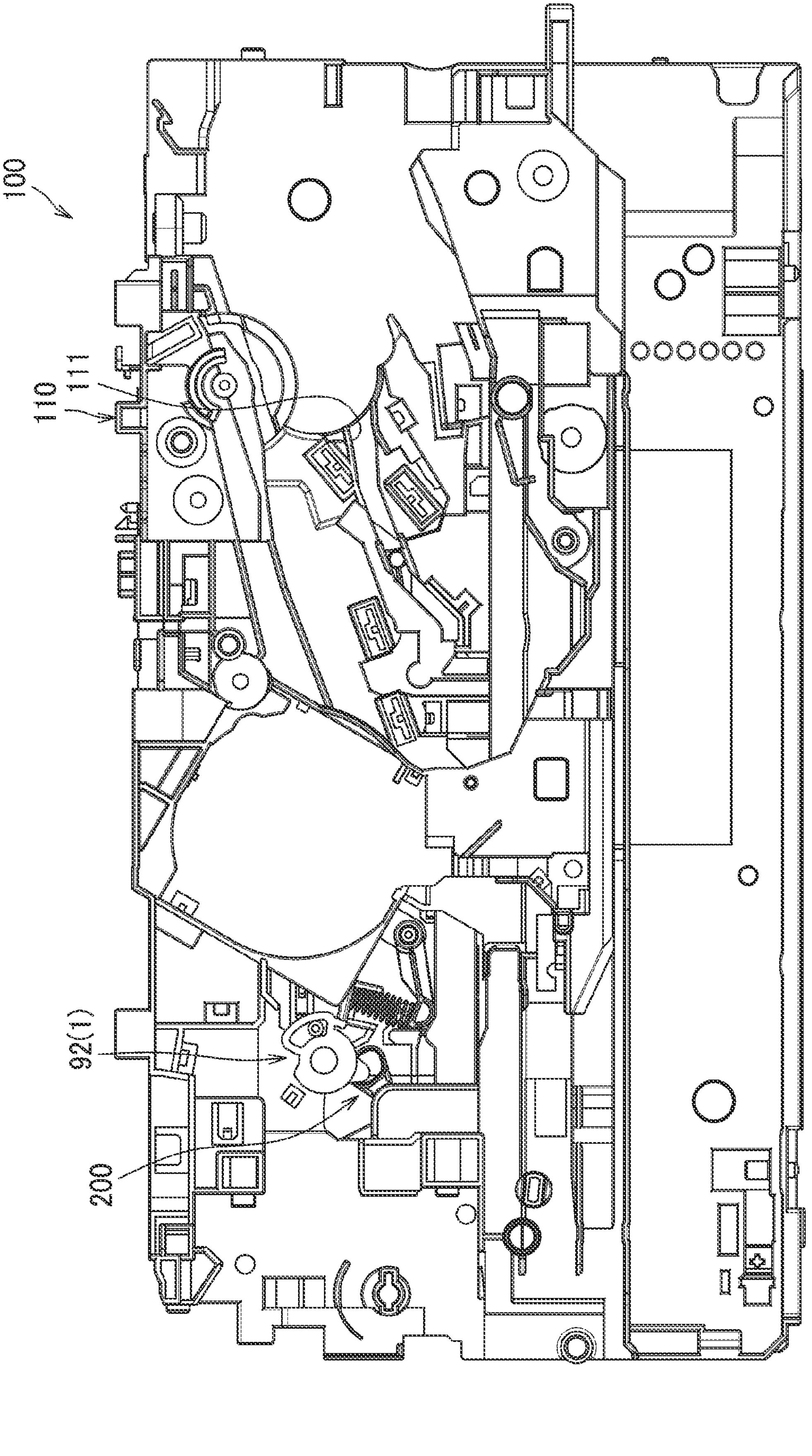
FIG. 15 is an illustration of an image forming apparatus, showing a main housing in which the fixing device is to be installed and other components.
Figure 16:
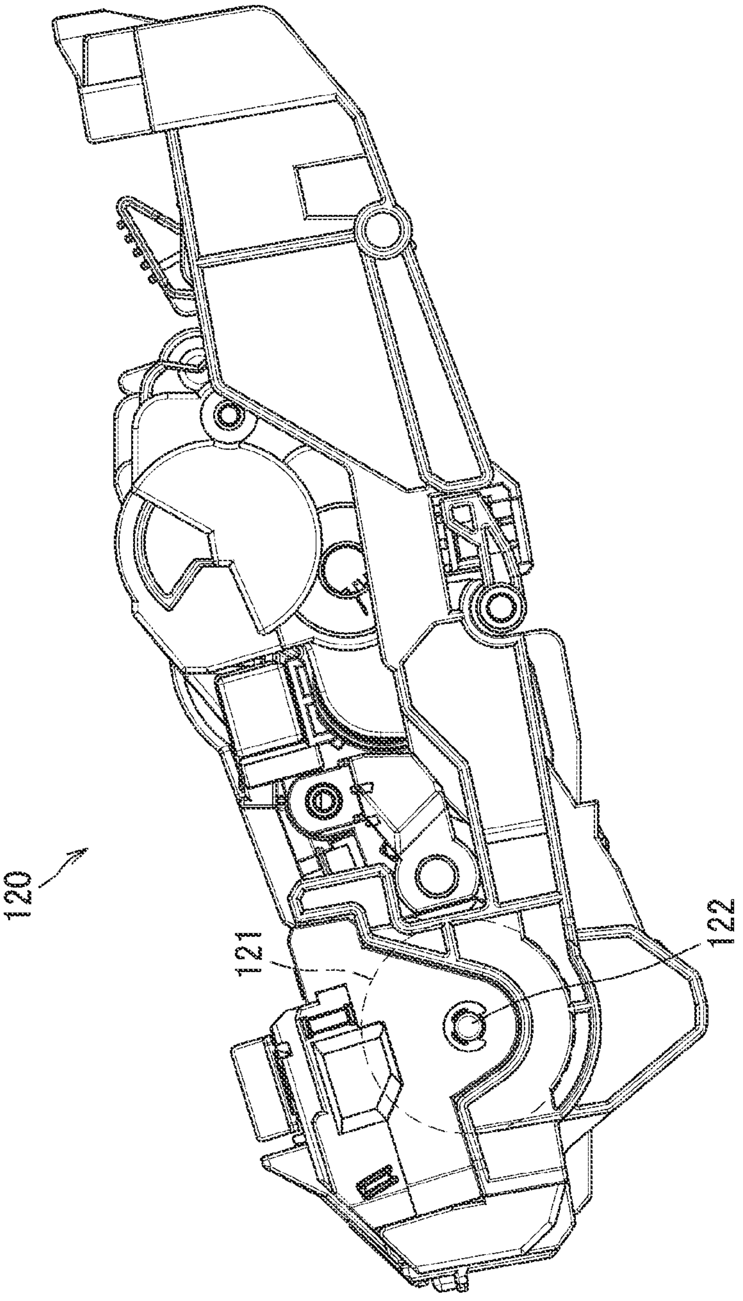
FIG. 16 is an illustration showing a unit installable into and removable from the main housing.

As shown in FIGS. 15 and 16, the image forming apparatus 100 comprises a main housing 110 as a main body of the image forming apparatus 100, a unit 120, a connection link 200, and the aforementioned fixing device 1. In FIG. 15, the arm cam 92 of the fixing device 1 is illustrated to show the position of the fixing device 1 and the other portions of the fixing device 1 are omitted.

As shown in FIG. 16, the unit 120 comprises a photosensitive drum 121. The photosensitive drum 121 comprises a drum shaft 122 as an example of a unit shaft. The drum shaft 122 is located on the center of rotation of the photosensitive drum 121. The unit 120 is installable into and removable from the main housing 110. As shown in FIG. 15, the main housing 110 includes a guide rail 111 for guiding the drum shaft 122.

Figure 17:
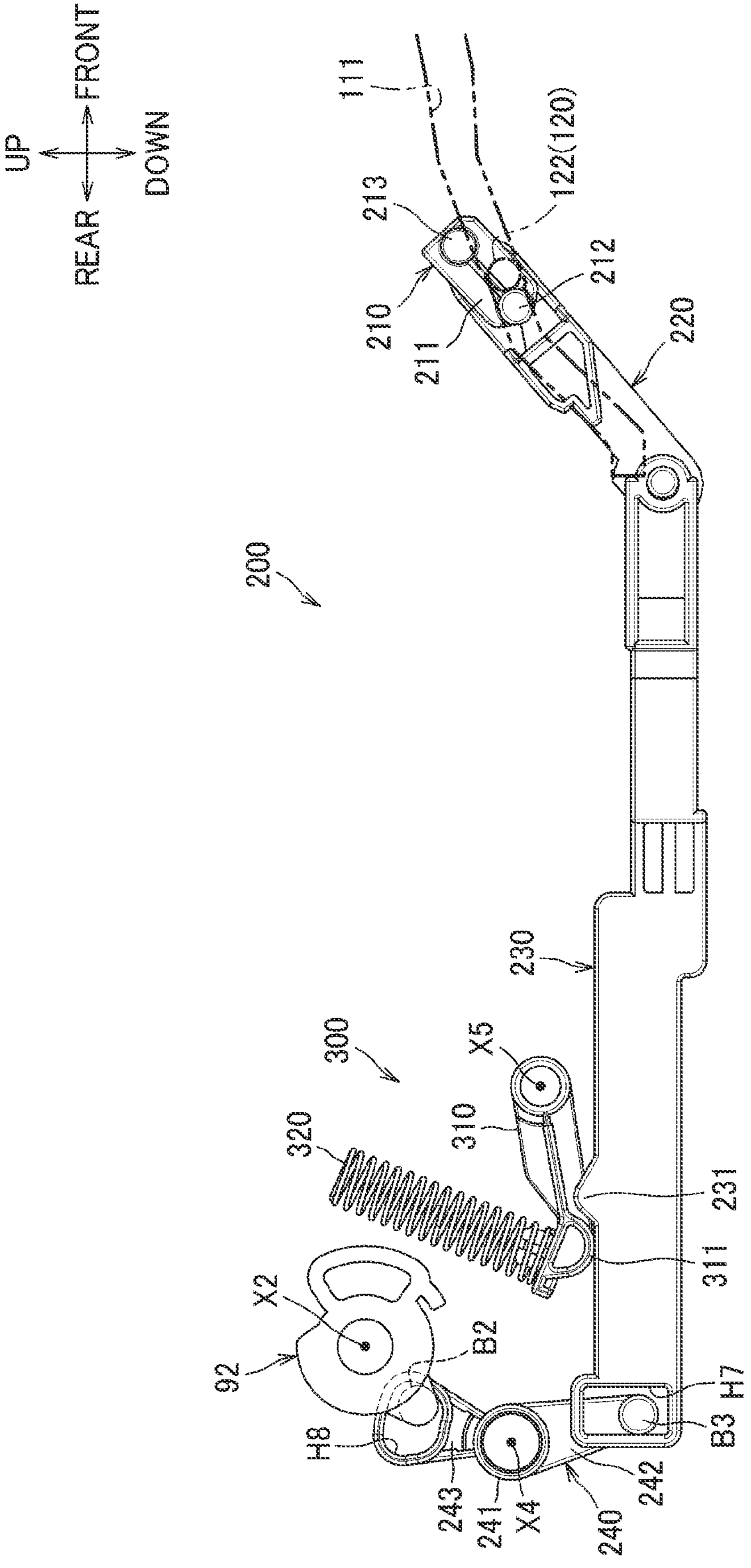
FIG. 17 is an illustration showing a connection link as observed when the unit is removed from the main housing.

As shown in FIG. 17, the connection link 200 is a mechanism that causes the shutter 50 to rotate from the closed position to the open position when the unit 120 is installed into the main housing 110, and causes the shutter 50 to rotate from the open position to the closed position when the unit 120 is removed from the main housing 110. The connection link 200 comprises an abutment piece 210, a first rotation link 220, a translation link 230, and a second rotation link 240.

The abutment piece 210 is movable and moves when contacted by the drum shaft 122. The abutment piece 210 is movably supported by an abutment piece rail (not shown). The abutment piece rail is provided on the main housing 110 or other components of the image forming apparatus 100.

The abutment piece 210 includes a body portion 211, a first protrusion 212, and a second protrusion 213. The first protrusion 212 and the second protrusion 213 protrude from the body portion 211 in the axial direction.

The drum shaft 122 contacts the first protrusion 212 when the unit 120 is installed into the main housing 110. The drum shaft 122 contacts the second protrusion 213 when the unit 120 is removed from the main housing 110.

Although the abutment piece 210 is configured to move when contacted by the drum shaft 122 in this example, a guide protrusion other than the drum shaft 122 may be formed on the unit 120 and the abutment piece 210 may be configured to move when contacted by the guide protrusion. In this case, the guide protrusion corresponds to the unit shaft.

The first rotation link 220 is a member having an approximately linear shape, connected to the abutment piece 210 and to the translation link 230. The body portion 211 of the abutment piece 210 is rotatably supported by one end of the first rotation link 220.

The translation link 230 is a member having an approximately linear shape, connected to the first rotation link 220 and to the second rotation link 240. The translation link 230 is movable in a front-rear direction relative to the main housing 110. One end of the translation link 230 supports the first rotation link 220 in a manner that allows the first rotation link 220 to rotate. The other end of the translation link 230 has an elongated hole H7 elongated in the up-down direction.

The second rotation link 240 is connected to the translation link 230 and is supported by the main housing 110 in a manner rotatable about a fourth axis X4. The second rotation link 240 includes a support portion 241, a first arm 242, and a second arm 243. The support portion 241 is rotatably supported by the main housing 110. The first arm 242 extends approximately downward from the support portion 241. The second arm 243 extends approximately upward from the support portion 241.

The first arm 242 includes a boss B3 received in the elongated hole H7 of the translation link 230. The second arm 243 has an elongated hole H8. The elongated hole H8 is formed in a shape of an arc with a center on the fourth axis X4.

The boss B2 of the arm cam 92 is received in the elongated hole H8 of the second rotation link 240. Accordingly, the connection link 200 is configured such that a force applied to the abutment piece 210 is transferred to the arm cam 92 via the first rotation link 220, the translation link 230, and the second rotation link 240.

The image forming apparatus 100 further comprises a lock 300 for keeping the shutter 50 in the open position or the closed position. Specifically, the lock 300 presses the translation link 230 to restrain movement of the translation link 230 in the front-rear direction. The lock 300 comprises a lock arm 310 in contact with the translation link 230, and a lock spring 320 that biases the lock arm 310 toward the translation link 230.

The lock arm 310 is supported by the main housing 110 in a manner rotatable about a fifth axis X5. The translation link 230 includes a link protrusion 231 protruding toward the lock 300. The link protrusion 231 is provided on a side of the connection link 200 facing the lock 300. The end 311 of the lock arm 310 can travel over the link protrusion 231 against the biasing force of the lock spring 320, as the translation link 230 moves in the front-rear direction.

When the end 311 of the lock arm 310 is located at a rear side of the link protrusion 231, movement of the translation link 230 toward the rear is restrained. When the end 311 of the lock arm 310 is located at a front side of the link protrusion 231, movement of the translation link 230 toward the front is restrained.

Next, the operation of the shutter actuation mechanism 90 and the connection link 200 will be described.

First of all, the operation of the shutter actuation mechanism 90 and the connection link 200 as performed when the unit 120 is being installed into the main housing 110 will be described. In the following description, the position of the arm cam 92 when the shutter 50 is located in the closed position is also referred to as "close-corresponding-position", and the position of the arm cam 92 when the shutter 50 is located in the open position is also referred to as "open-corresponding-position"

Figure 18:
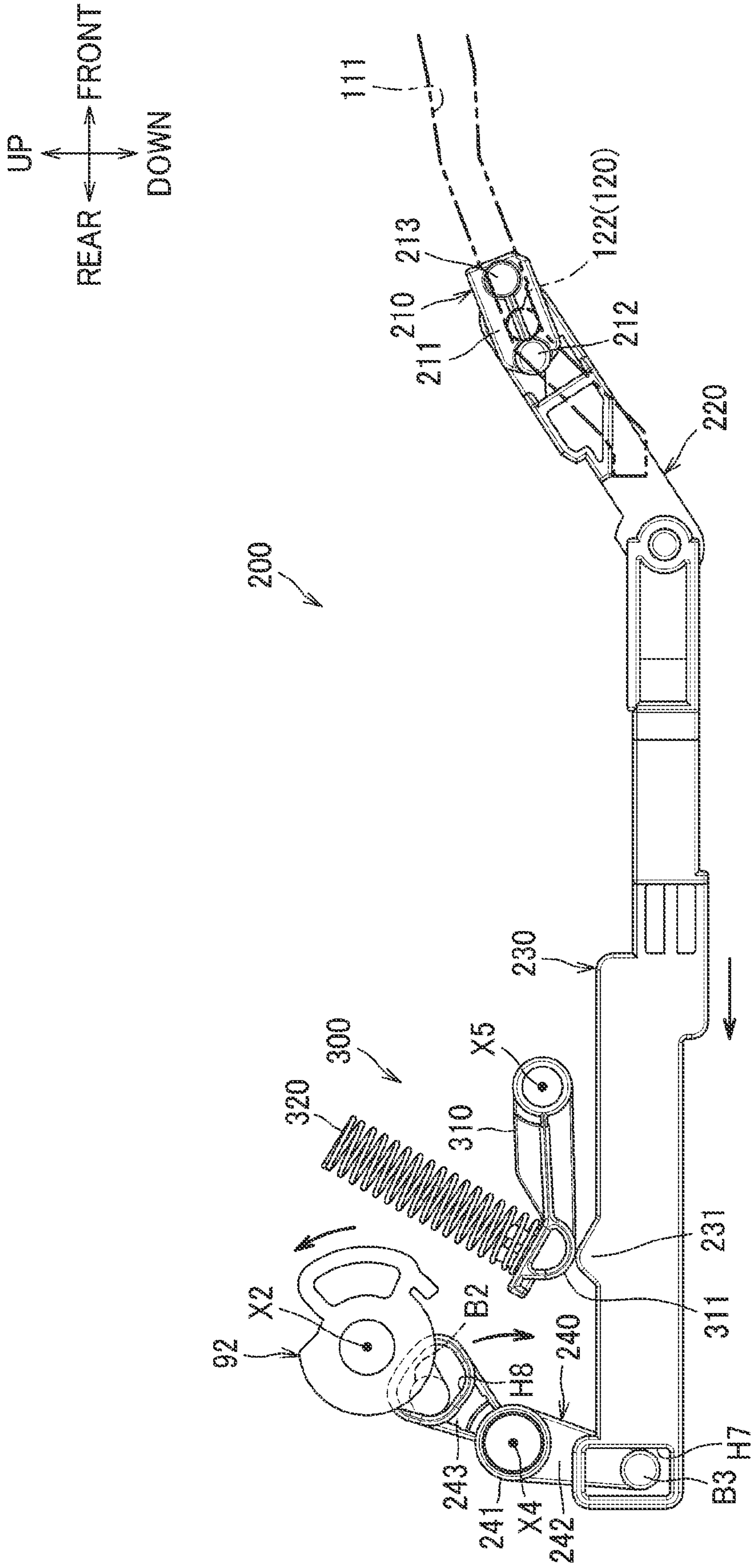
FIG. 18 is an illustration showing the connection link as observed when the unit is installed halfway into the main housing.

As shown in FIG. 17, as the drum shaft 122 of the unit 120 is inserted into the guide rail 111 of the main housing 110, the drum shaft 122 contacts the first protrusion 212 of the abutment piece 210 and pushes the abutment piece 210 toward the rear. As shown in FIG. 18, the force applied to the abutment piece 210 from the drum shaft 122 is thereby transmitted to the second rotation link 240 via the first rotation link 220 and the translation link 230, so that the second rotation link 240 rotates in the clockwise direction of FIGS. 17 to 19.

Figure 19:
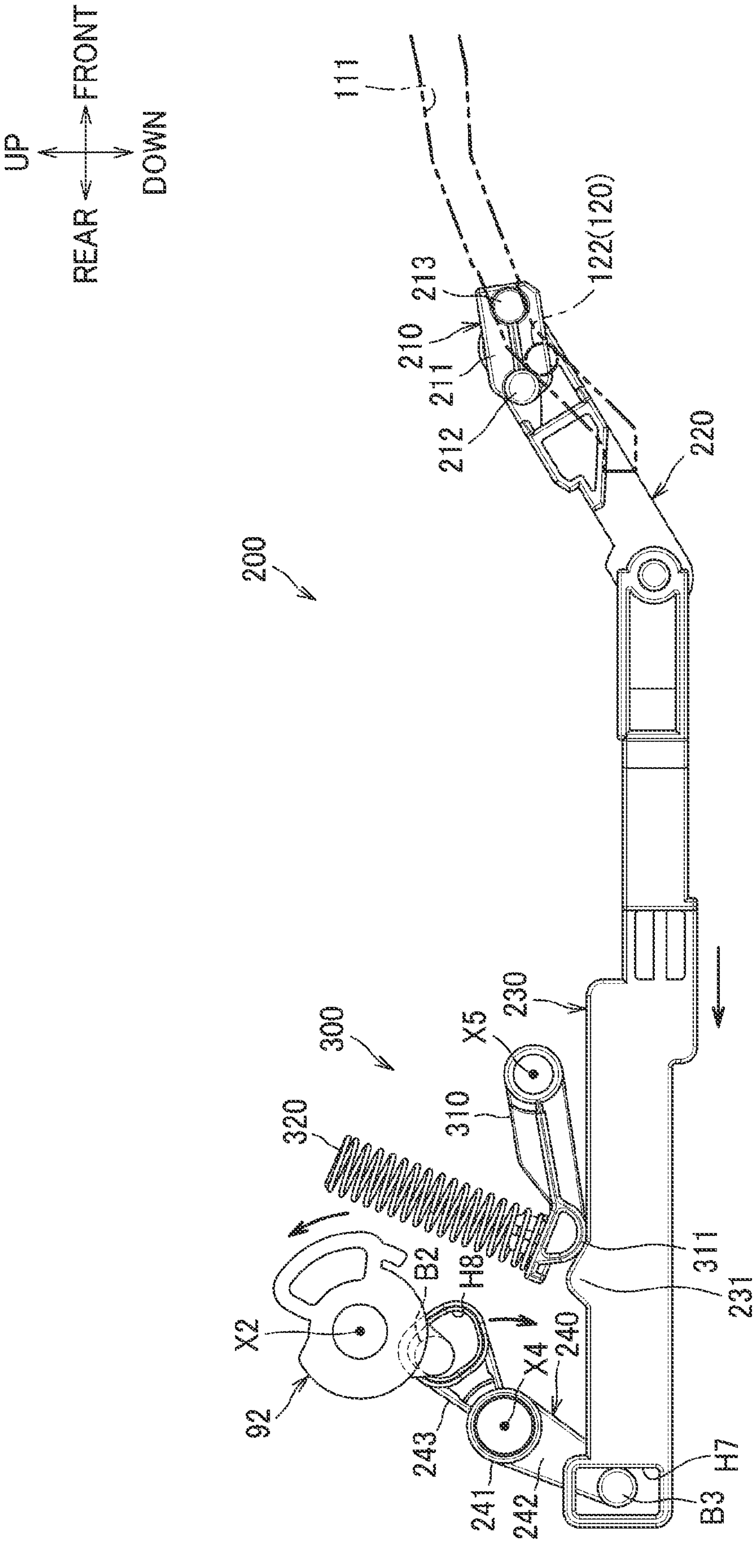
FIG. 19 is an illustration showing the connection link as observed when the unit is installed in the main housing.

When the second rotation link 240 rotates in the clockwise direction of FIGS. 17 to 19, the second rotation link 240 pushes the boss B2 of the arm cam 92, so that the arm cam 92 rotates from the close-corresponding-positon to the open-corresponding-position.

In the process of the arm cam 92 rotating from the close-corresponding-position to the open-corresponding-position, the second contact surface T2 of the arm cam 92 pushes the boss B1 of the shutter arm 91, as shown in FIG. 13B, so that the shutter arm 91 rotates from the position shown in FIG. 12A to the position shown in FIG. 13A. The shutter 50 connected to the shutter arm 91 thereby rotates from the closed position to the open position.

As shown in FIG. 19, as the unit 120 installed in the main housing 110 is being removed from the main housing 110, the drum shaft 122 moves forward along the guide rail 111, contacts the second protrusion 213 of the abutment piece 210, and pushes the abutment piece 210 forward. A force applied to the abutment piece 210 from the drum shaft 122 is thereby transmitted to the second rotation link 240 via the first rotation link 220 and the translation link 230, so that the second rotation link 240 rotates in the counter-clockwise direction of FIGS. 17 to 19.

When the second rotation link 240 rotates in the counter-clockwise direction of FIGS. 17 to 19, the second rotation link 240 pushes the boss B2 of the arm cam 92, so that the arm cam 92 rotates from the open-corresponding-positon to the close-corresponding-position.

In the process of the arm cam 92 rotating from the open-corresponding-position to the close-corresponding-position, the first contact surface T1 of the arm cam 92 pushes the boss B1 of the shutter arm 91 via the spring 93 as shown in FIG. 12B, so that the shutter arm 91 rotates from the position shown in FIG. 13A to the position shown in FIG. 12A. The shutter 50 connected to the shutter arm 91 thereby rotates from the open position to the closed position.

According to the above-described example, the following advantageous effects can be obtained.

Since the rotation axis of the shutter arm 91 coincides with the rotation axis of the cam 80 as shown in FIG. 11, the length of the shutter arm 91 protruding outward from the frame 4 can be reduced; thus the upsizing of the image forming apparatus 100 can be restrained.

As shown in FIGS. 12A and 13A, since the protrusion 54 is located on the side of the plane (straight line L1) on which the nip NP is located when the shutter 50 is in the closed position, and the protrusion 54 is located on the side of the plane (straight line L1) opposite to the side on which the nip NP is located when the shutter 50 is in the open position, the open/close operation of the shutter 50 can be performed even if a length of the elongated hole H4 is reduced; thus, the upsizing of the shutter arm 91 can be restrained.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described example, the shutter arm is configured to move in conjunction with the operation of installing the unit into the main housing. However, the shutter arm may be configured to move in conjunction with the operation of opening/closing the cover for the main housing performed to install or remove the unit into or from the main housing. That is, the shutter arm may be rotated from the closed position to the open position when the cover is closed. In this case, the shutter arm and the cover may be linked using a cam or a link or the like so that the shutter is located, for example, in the closed position when the cover is opened and in the open position when the cover is closed.

Although the shutter includes the boss in the above-described example, for example, the frame of the fixing device may include a boss and the shutter may include a hole in which the boss is received.

Although the protrusion is located on the side of the plane (straight line L1) on which the nip is located when the shutter is in the closed position and on the side of the plane (straight line L1) opposite to the side on which the nip is located when the shutter is in the open position in the above-described example, for example, the protrusion may be located on the side of the straight line L1 on which the nip is located regardless of whether the shutter is in the closed position or the open position, or the protrusion may be located on the side of the plane (straight line L1) opposite to the side on which the nip is located regardless of whether the shutter is in the closed position or the open position.

The power-supply terminal may be disposed on both ends of the substrate located apart from each other in the longitudinal direction.

The spring is not limited to the torsion spring and may be, for example, a leaf spring, a wire spring, etc.

The first rotating body is not limited to a belt and may be, for example, a heating roller comprising a hollow cylindrical metal tube.

The second rotating body is not limited to a pressure roller, and may be, for example, a belt for a pressure unit comprising a pressure pad and the belt. In this case, the belt as the second rotating body may be nipped between the pressure pad and the first rotating body.

The first rotating body may be a pressure roller or a pressure unit belt or the like. The second rotating body may be a belt or a heating roller or the like heated by the heater.

The unit installable into or removable from the main housing of the image forming apparatus may comprise a development roller and/or a container containing toner. The unit needs only to comprise at least one of a photosensitive drum, a development roller, and the container.

The heater is not limited to a ceramic heater, and may be, for example, a halogen lamp. In this case, the heating unit may comprise a belt, a nip plate that nips the belt in combination with a pressure roller, and a heater that heats the nip plate.

The elements described in the above example embodiment and its modified examples may be implemented selectively and in combination.

What is claimed is:

1. A fixing device, comprising:
- a first rotating body;
- a second rotating body configured to form a nip in combination with the first rotating body;
- a frame configured to support the first rotating body and the second rotating body, the frame having an opening through which a sheet conveyed toward the nip passes;
- a shutter rotatable about a first axis between a closed position in which the shutter covers the opening and an open position in which the shutter uncovers the opening;
- a pressure arm configured to press the first rotating body against the second rotating body;
- a cam supported by a shaft and configured to push the pressure arm, the cam and the shaft being rotatable about a second axis;
- a shutter arm connected to the shutter and configured to rotate about the shaft independent of the cam, to cause the shutter to rotate between the closed position and the open position; and
- an arm cam configured to rotate about the shaft to push the shutter arm at a position offset from the second axis and cause the shutter arm to rotate about the second axis.

2. The fixing device according to claim 1,
- wherein the arm cam includes a hollow cylindrical portion in which the shaft is received, and
- wherein the shutter arm has a hole in which the hollow cylindrical portion is received.

3. The fixing device according to claim 1,
wherein the shutter includes a protrusion, and
wherein the shutter arm has an elongated hole in which the protrusion is received.

4. The fixing device according to claim 3,
wherein when the shutter is in the closed position, the protrusion of the shutter is located on a side of a plane containing the first axis and the second axis, on which the nip is located, and
wherein when the shutter is in the open position, the protrusion of the shutter is located on another side of the plane, opposite to the side on which the nip is located.

5. The fixing device according to claim 1, further comprising a shaft that supports the cam, the shaft being rotatable about the second axis,
wherein the frame comprises:
a first frame configured to support the first rotating body and the second rotating body; and
a second frame attached to the first frame and configured to hold the shaft in combination with the first frame, and
wherein the shutter is supported by the second frame via a boss.

6. The fixing device according to claim 5, wherein the boss is located on an upstream side of the nip in a direction of conveyance of the sheet.

7. The fixing device according to claim 1, wherein the second axis is located on a downstream side of the nip in a direction of conveyance of the sheet.

8. The fixing device according to claim 1,
wherein the pressure arm comprises a first pressure arm and a second pressure arm located at opposite ends of the frame apart from each other in a longitudinal direction, and
wherein the first pressure arm is located between the shutter arm and the second pressure arm in the longitudinal direction.

9. The fixing device according to claim 1, further comprising a heater comprising a substrate and a resistance heating element disposed on the substrate,
wherein the first rotating body is an endless belt heated by the heater and configured to rotate around the heater.

10. The fixing device according to claim 9, further comprising a connector configured to provide electricity to the heater,
wherein the heater comprises a power-supply terminal on at least one of two opposite ends of the substrate located apart from each other in the longitudinal direction, the power-supply terminal being supplied with electricity from the connector,
wherein the second rotating body is a pressure roller rotatable about a third axis, and
wherein the shutter arm is located on a side of the connector opposite to another side of the connector on which the third axis is located.

11. The fixing device according to claim 1, further comprising a spring contactable with the shutter arm,
wherein the arm cam is configured to push the shutter arm via the spring to locate the shutter in the closed position.

12. The fixing device according to claim 11, wherein the arm cam is configured to contact the shutter arm to locate the shutter in the open position.

13. An image forming apparatus, comprising:
a main housing;
a unit installable into and removable from the main housing; and
the fixing device according to claim 1,
wherein the arm cam rotates about the second axis when the unit is installed into or removed from the main housing, and
wherein the shutter arm causes the shutter to rotate from the closed position to the open position when the unit is installed into the main housing, and causes the shutter to rotate from the open position to the closed position when the unit is removed from the main housing.

14. The image forming apparatus according to claim 13, further comprising a connection link connected to the arm cam, the connection link being movable relative to the main housing and configured move when the unit being installed into the main housing contacts the connection link.

15. The image forming apparatus according to claim 14, further comprising a lock configured to keep the shutter in the open position or in the closed position, the lock comprising a lock arm configured to contact the connection link, and a lock spring that biases the lock arm toward the connection link,
wherein the connection link includes a link protrusion provided on a side thereof facing the lock.

16. The image forming apparatus according to claim 14,
wherein the unit comprises a unit shaft configured to contact the connection link when the unit is being installed into the main housing, and
wherein the main housing includes a guide rail configured to guide the unit shaft.

17. The image forming apparatus according to claim 14, wherein the unit comprises a photosensitive drum.

* * * * *